United States Patent
Lemmer

(10) Patent No.: US 11,808,738 B2
(45) Date of Patent: Nov. 7, 2023

(54) SUPPORT JIG WITH IMPROVED SUPPORT GRIPS

(71) Applicant: MTS SYSTEMS CORPORATION, Eden Prairie, MN (US)

(72) Inventor: Steven Ray Lemmer, Norwood, MN (US)

(73) Assignee: MTS SYSTEMS CORPORATION, Eden Prairie, MN (US)

( * ) Notice: Subject to any disclaimer, the term of this patent is extended or adjusted under 35 U.S.C. 154(b) by 0 days.

(21) Appl. No.: 17/508,756

(22) Filed: Oct. 22, 2021

(65) Prior Publication Data

US 2022/0128440 A1 Apr. 28, 2022

Related U.S. Application Data

(60) Provisional application No. 63/105,199, filed on Oct. 23, 2020.

(51) Int. Cl.
  *G01N 3/04* (2006.01)
  *G01N 3/08* (2006.01)

(52) U.S. Cl.
  CPC ............... *G01N 3/04* (2013.01); *G01N 3/08* (2013.01); *G01N 2203/0017* (2013.01)

(58) Field of Classification Search
  None
  See application file for complete search history.

(56) References Cited

U.S. PATENT DOCUMENTS

| 3,309,918 A * | 3/1967 | Scott ............... G01N 3/04 73/833 |
| 2016/0084065 A1* | 3/2016 | DeBerry ............ E21B 17/085 166/336 |

OTHER PUBLICATIONS

MTS Systems: "Installing Specimen in MTS Advantage Mini Grips", Oct. 6, 2021, retrieved from https://www.youtube.com/watch?v=8e5y-aFHwXM.
MTS Systems: "Introducing MTS Advantage Mini Grips", Oct. 6, 2021, retrieved from https://www.youtube.com/watch?v=waYdHmRu_OU.

(Continued)

*Primary Examiner* — Brandi N Hopkins
*Assistant Examiner* — Nigel H Plumb
(74) *Attorney, Agent, or Firm* — Steven M. Koehler; Westman, Champlin & Koehler, P.A.

(57) ABSTRACT

A support jig for use with a testing machine applying loads, the support jig includes a frame and a pair of spaced apart supports joined to the frame to provide an alignment axis. Each support is configured to releasably hold a test specimen holder on the alignment axis in a fixed spatial relationship with ends of the test specimen holders mountable to the test machine facing in opposite directions. A test specimen support is located between the holders holds the test specimen on the alignment axis so that the holders can be attached to the test specimen. The support jig allows the holders to be easily and correctly attached to the test specimen so as to maintain alignment of the holders and the test specimen on the alignment axis. The support jig also maintains the fixed spatial relationship of the holders and test specimen while the holders are mounted to the test machine.

40 Claims, 23 Drawing Sheets

(56) References Cited

OTHER PUBLICATIONS

MTS: "MTS Advantage (TM) Mini Grips Fast, Accurate Specimen Gripping for Small Specimen Testing", Sep. 23, 2021, retrieved from https://www.mts.com/-/media/materials/pdfs/brochures/mts-advantage-mini-grips-brochure.pdf.
International Search Report and Written Opinion in corresponding International Patent Application No. PCT/US2021/056319 dated Feb. 8, 2022.

* cited by examiner

SUPPORT JIG WITH IMPROVED SUPPORT GRIPS

BACKGROUND

The discussion below is merely provided for general background information and is not intended to be used as an aid in determining the scope of the claimed subject matter.

Test specimen holders or grips are well known in the material testing art and are used frequently to hold a test specimen in a material testing system. The holder includes opposed jaws or wedges that holder the test specimen therebetween. Although such test specimen holders have been around for a long time, use of such holders has been confined to test specimens that are relatively large. Use on very small test specimens is not known.

Typical test specimens use geometries that have a minimum length of 25 mm or greater and cross sections of multiple millimeters×multiple millimeters. These specimens can be used in a variety of test specimen holders. The holders are installed in a force reaction structure or test machine that applies longitudinal forces along the long axis of the specimen. The holders typically have a method of crudely, but repeatably aligning the test specimen in the holder and the holders can be aligned to each other easily to ensure low bending strains as required by ASTM testing procedures. The holders also require the user to install the specimen in the holders while the test machine is actively maintaining position and load.

The field of additively manufactured components has required investigation into the material properties of the deposition process. This has resulted in specimen cross section geometries of less than 1 mm thick and less than 1 mm wide with an overall length of less than 10 mm. These specimen sizes do not fit with current specimen holders and there is no method of inserting the specimen in the holders in a repeatable fashion. There are also concerns as the specimens are so small that requires additional time to install a specimen thereby exposing the user to an active machine for a longer duration of time.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background.

Generally, a support jig for use with a testing machine applying tensile loads includes a frame and a pair of spaced apart supports joined to the frame to provide an alignment axis. Each support is configured to releasably hold a test specimen holder on the alignment axis in a fixed spatial relationship with ends of the test specimen holders mountable to the test machine facing in opposite directions. The support jig can be used with any type of test specimen holder including but not limited to the test specimen holders herein disclosed comprising separate and additional aspects of the present invention.

In a one embodiment, the support jig further includes a test specimen support joined to the frame between the pair of spaced apart supports. The test specimen support conveniently holds the test specimen on the alignment axis so that the test specimen holders can be secured to each end of the test specimen. An end of the test specimen support can have a recess to receive the test specimen. Preferably, the test specimen support comprises a first portion joined to the frame and a second portion having the end. The second portion is adjustably secured to the first portion so as to adjust a position of the end orthogonally with respect to the alignment axis, which allows test specimens of different widths to be accurately placed on the alignment axis. The second portion can be linearly adjustable with respect to the first portion such as by telescoping with respect to the first portion.

Preferably, the pair of supports comprises a first support and a second support, wherein at least one support, and preferably both, are adjustably positionable on the frame to axially adjust a position of the support(s) on the alignment axis. In a preferred embodiment, each support includes a recess or protrusion spaced apart from the alignment axis that is complimentary to a protrusion or recess, respectively, provided on the associated test specimen holder securable to the support. The complementary engagement of the protrusion and the recess orients the test specimen holders about the alignment axis so as to properly mount to the test specimen.

In one embodiment, each support provides a mounting aperture for receiving a portion of the test specimen holder. Preferably, each support includes a removable portion securable to the end that forms the mounting aperture so as to allow convenient mounting of each test specimen holder. The end of each support and the removable portion include surfaces engageable with the test specimen holder that are complimentary with the test specimen holder.

Another aspect of the present invention is a method of using the support jig to remotely mount the test specimen to the test specimen holders from the test machine, and then using the support jig to maintain the fixed special relationship while the test specimen holders are mounted to the test machine.

In one embodiment, the method for loading a test specimen in a tensile test machine having a first test specimen holder and a second test specimen holder, includes: providing a support jig remote from the test machine; mounting the first test specimen holder and the second test specimen holder to the support jig so that heads configured to hold ends of the test specimen face each other and ends of the test specimen holders securable to the test machine face in opposite directions, the test specimen holders being aligned with each other and located on a common alignment axis; securing heads of the first and second test specimen holders to first and second ends, respectively, of the test specimen; and mounting the first test specimen holder and the second test specimen holder in the tensile test machine wherein the support jig holds the first test specimen holder and the second test specimen holder on the alignment axis and in a fixed spatial relationship relative to each other.

In a further embodiment, the jig incudes a test specimen support and the method further comprises mounting the test specimen to the test specimen support so as to be aligned with the alignment axis. Preferably, mounting the test specimen to the test specimen support so as to be aligned with the alignment axis occurs before securing the heads of the first test specimen holder and the second test specimen holder to the test specimen.

The jig can include a first support and a second support coupled to a frame, and wherein mounting the first test specimen holder and the second test specimen holder to a support jig comprises mounting the first test specimen holder to the first support and the second test specimen holder to the second support. Mounting the first test specimen holder and the second test specimen holder in the tensile test machine can occur after mounting the first test specimen holder and the second test specimen holder to the support jig and/or securing heads of the first and second test specimen holders to test specimen.

If desirable, so as to provide proper alignment of the test specimen holders to each other so as to hold the test specimen correctly, mounting the first test specimen holder and the second test specimen holder to the support jig can include fixing a rotational position of each of the first test specimen holder and the second test specimen holder about the alignment axis. Preferably, securing heads of the first and second test specimen holders to first and second ends, respectively, of the test specimen includes applying a pre-load clamping holding force to end of the test specimen.

Another aspect of the present invention is a test specimen holder comprising a head body having a first inclined body surface and a second inclined body surface facing each other. A first and second wedge are located in the head body, the first wedge having a first inclined wedge surface in sliding contact with the first inclined body surface and the second wedge having a second inclined wedge surface in sliding contact with the second inclined body surface. A support shaft has a first end connectable to a portion of a test machine and a second end supporting the first and second wedges. A drive is supported by the support shaft, the drive being located between the second end and the first end. A spring is connected to the head body at a first end and to the drive at a second end.

Preferably, the drive is configured to pull the second end of the spring away from the head body. The drive can comprise a first portion movable with respect to a second portion, the first portion being connected to the second end of the spring and the second portion engages or is fixedly joined to a portion of the support shaft. The first portion can moves axially relative to the support shaft either with or without rotation about the support shaft.

The drive can include a driven part in contact with and movable relative to the first portion and the second portion. The driven part is movable toward and away from a longitudinal axis of the support shaft. Preferably, the drive includes an actuator supported by the first portion in contact with the driven part. In one embodiment, the actuator comprises a drive screw threadably engaging the first portion.

Engaging surfaces of the driven part and the second portion can include at least one inclined surface on at least one of the driven part and/or the second portion. Preferably, engaging surfaces of the driven part and the second portion are each an inclined surface.

The drive can include a wall forming a chamber about the support shaft, the driven element being disposed in the chamber, the drive can include an end cap joined to an end of the wall.

In one embodiment, the spring comprises a plurality of longitudinal spring elements disposed about the support shaft, preferably as a cylindrical body at least partially around the support shaft where the spring elements are integral with the body being formed from a single unitary body with longitudinal slots.

Preferably, at least one of the mount or the head body comprises one of an aperture opening to an outer surface and extending inwardly transversely to a longitudinal axis of the support shaft or a pin extending away from the outer surface in a direction transversely from the longitudinal axis so as to allowing mounting of the test specimen holder to the support jig.

Another embodiment of a test specimen holder includes a head body having a first inclined body surface and a second inclined body surface facing each other. First and second wedges are located in the head body, the first wedge having a first inclined wedge surface in sliding contact with the first inclined body surface and the second wedge having a second inclined wedge surface in sliding contact with the second inclined body surface. A mount is joined to the head body at a first end and has a bore. A support shaft is disposed in the bore and has a first end supporting the first and second wedges. A spring urges the support shaft toward the head body.

In one embodiment, the bore includes an inner flange, a first end of the spring engaging the support shaft and a second end engaging the inner flange. The spring can comprise a compression spring.

In one embodiment, an adjuster is provided and adjusts a force urging the support shaft toward the head body. The adjuster can comprise an actuator joined to the support shaft. For example, the actuator can comprise a screw threadably joined to the mount.

Preferably, a handle is joined to the support shaft and comprises portions extending in opposite directions from a longitudinal axis of the support shaft.

Preferably, at least one of the mount or the head body comprises one of an aperture opening to an outer surface and extending inwardly transversely to a longitudinal axis of the support shaft or a pin extending away from the outer surface in a direction transversely from the longitudinal axis so as to allowing mounting of the test specimen holder to the support jig.

DETAILED DESCRIPTION

Figure 1:
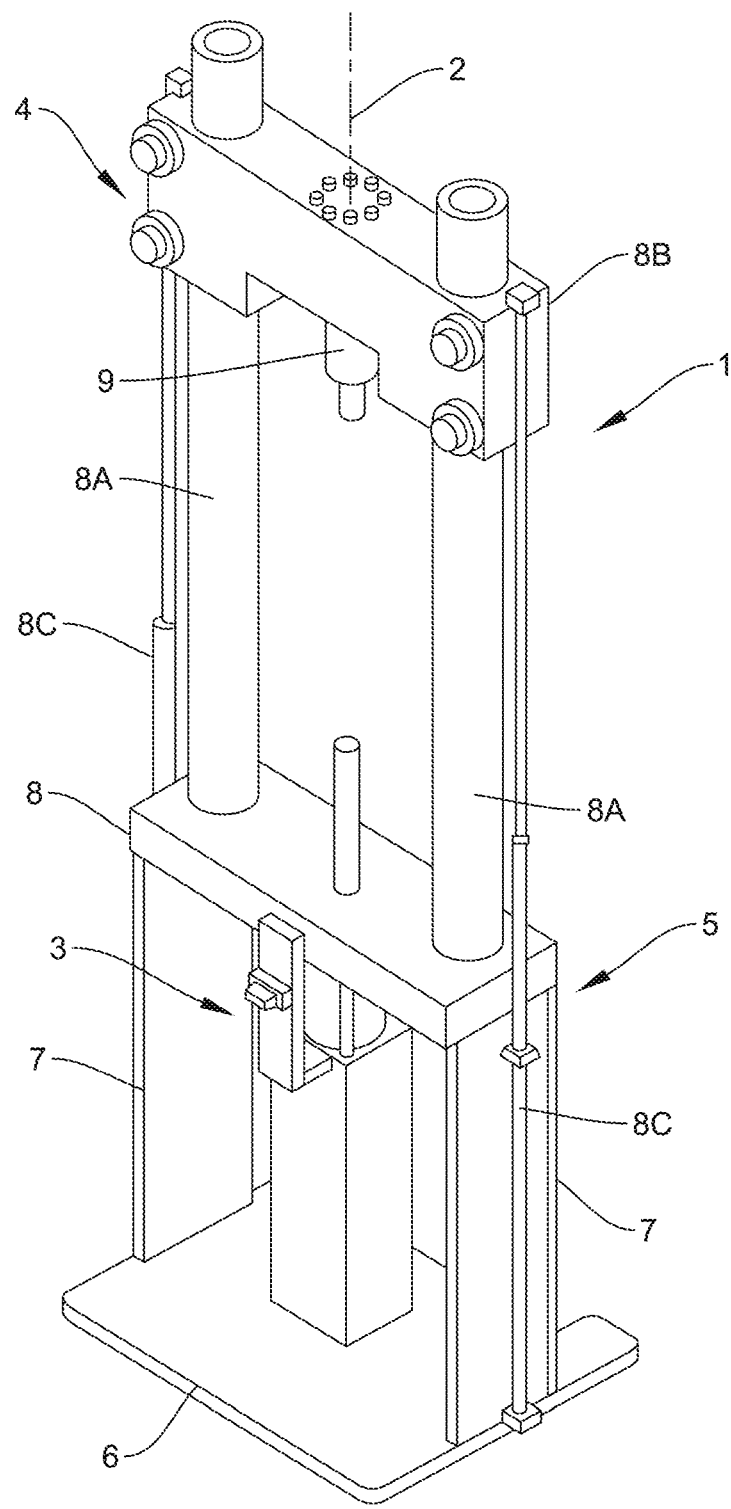
FIG. 1 is a perspective view of a test machine.

A material testing system 1 for applying force loads to a test specimen is illustrated in FIG. 1. The system 1 typically would include an upper test specimen holder and an identical lower test specimen holder both of the type illustrated and described below. The test specimen holders hold a test specimen along a longitudinal axis 2. In the embodiment illustrated, the lower test specimen holder is connected to an actuator 3 through which force loads are applied to the test specimen and reacted against a reaction structure generally indicated at 4.

In the exemplary embodiment illustrated, although other configurations are known and can be used with aspects of the invention described below, the material testing system 1 includes a frame 5 having a base 6. A pair of support members 7 extends upwardly from the base 6 and are joined together by a crossbeam 8 which provides a stable support surface. A pair of support columns 8A extends upwardly from the crossbeam 8 to a crosshead 8B movable on the support columns 8A. A load cell 9 can join the upper test specimen holder to the crosshead 8B, as illustrated, or can join the lower test specimen holder to a rod of the actuator 3. As is known in the art, the load cell 9 provides a signal indicative of tension or compression forces applied to the test specimen. The crosshead 8 and the support columns 8A provide the reaction structure. Hydraulic lifts 8C move the crosshead 8 to selectively fixed positions.

Generally, among other aspects, a test specimen holder 100, 200 (FIGS. 4-19) is described capable of through zero fatigue loading, tension loading, and compression loading of miniature and sub-miniature test specimens of both flat and round geometries. The test specimen holder 100, 200 works in conjunction with a specimen insertion or support jig 10 (FIGS. 2, 3 and 20-23) that has the purpose of allowing specimen insertion to happen on a workbench or table remotely from the test machine 1. The support jig holds the specimen holders 100, 200 rigidly and accurately so that bending strains on the specimen inherent to the installation process are limited and repeatable. The support jig 10 provides a method of introducing clamping forces into the specimen holders 100, 200 while not applying errant load to the specimen. The support jig 10 allows the user to verify the installation accuracy, and allows the installation of the jig/specimen holder sub-system to be installed into the test machine 1 without errant loads being applied to the test specimen until such time that the test machine 1 is in control and managing loads and displacements.

An aspect of the disclosure is the support jig 10 (FIGS. 2, 3 and 20-23) that is used to mount a test specimen 15 to test specimen holders or grips 100, 200 so as to be accurately positioned in the holders 100, 200 without undesired loading, which can damage or break the test specimen 15 as well as aligning the test specimen 15 with axes of the test specimen holders 100, 200 so as to perform required testing in the testing machine 1. The support jig 10 allows loading the test specimen 15 to the test specimen holders 100, 200 in an accurate and repeatable manner.

Figure 22:
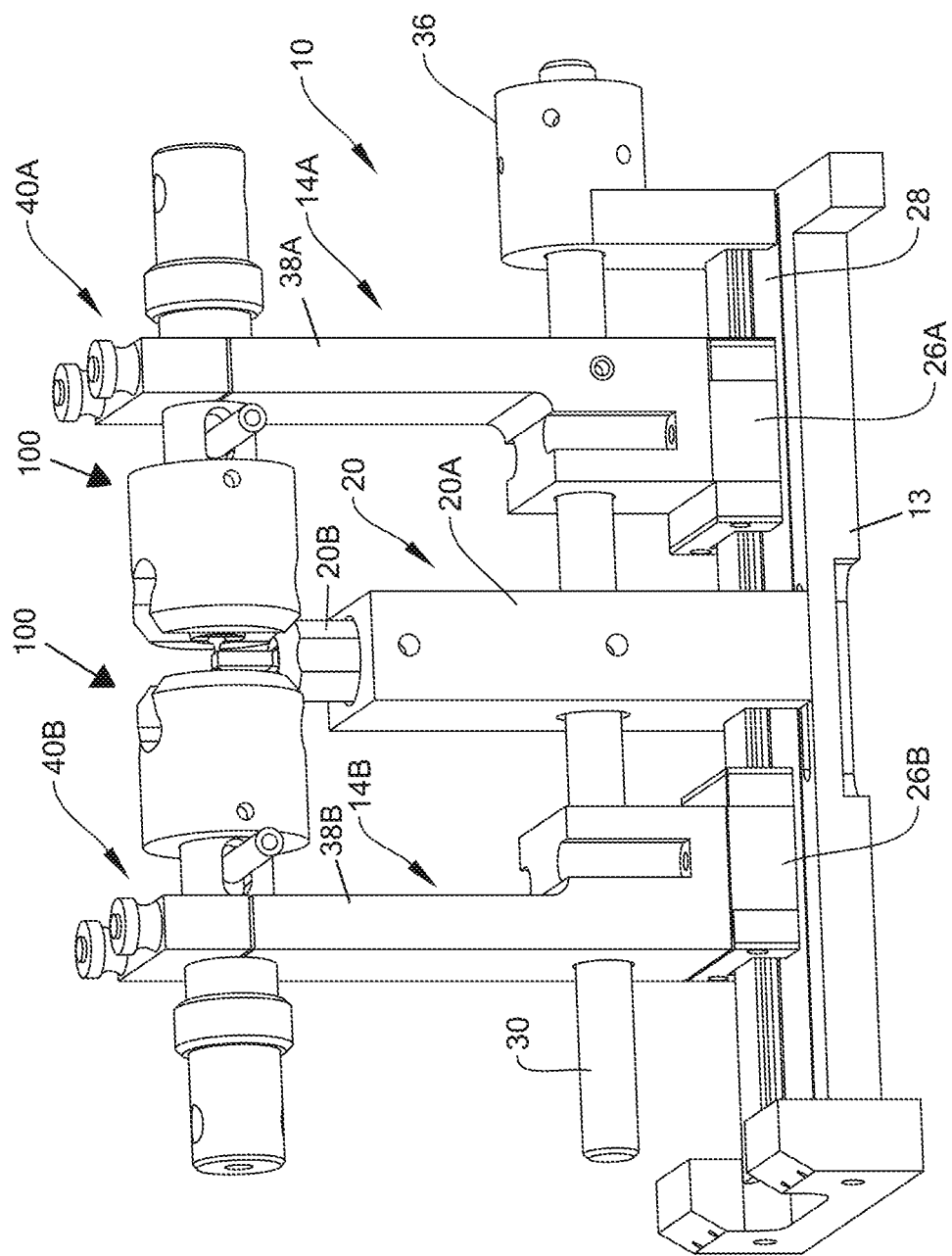

With the test specimen 15 loaded in the test specimen holders 100, 200, and the test specimen holders 100, 200 secured to the jig 10, the complete assembly comprising the test specimen holders 100, 200, support jig 10 and test specimen 15, as illustrated in FIG. 22, can be transferred to the test machine 1 (FIG. 23), such the test machine 1 described above, can be used to impart forces and/or displacements to the test specimen 15. Such test machines are known in the art as a tension or tensile tester (used for applying monotonic or single directions loads) or a tension/compression tester (which can be used in fatigue testing where alternating tension and compression loads can be applied). If desired, a rotational actuator, not shown, can be part of the test machine 1 with or without the linear actuator 3. The support jig 10 allows the test specimen holders 100, 200 and the test specimen 15 attached between the holders 100, 200 to be loaded into the test machine 1 without causing breakage of the test specimen 15 because all loads between the test specimen holders 100, 200 are transferred through the support jig 10 rather than through the test specimen 15. When the test specimen holders 100, 200 have been secured in the test machine 1, the jig 10 can be detached from the test specimen holders 100, 200 so that testing can commence.

Figure 2:
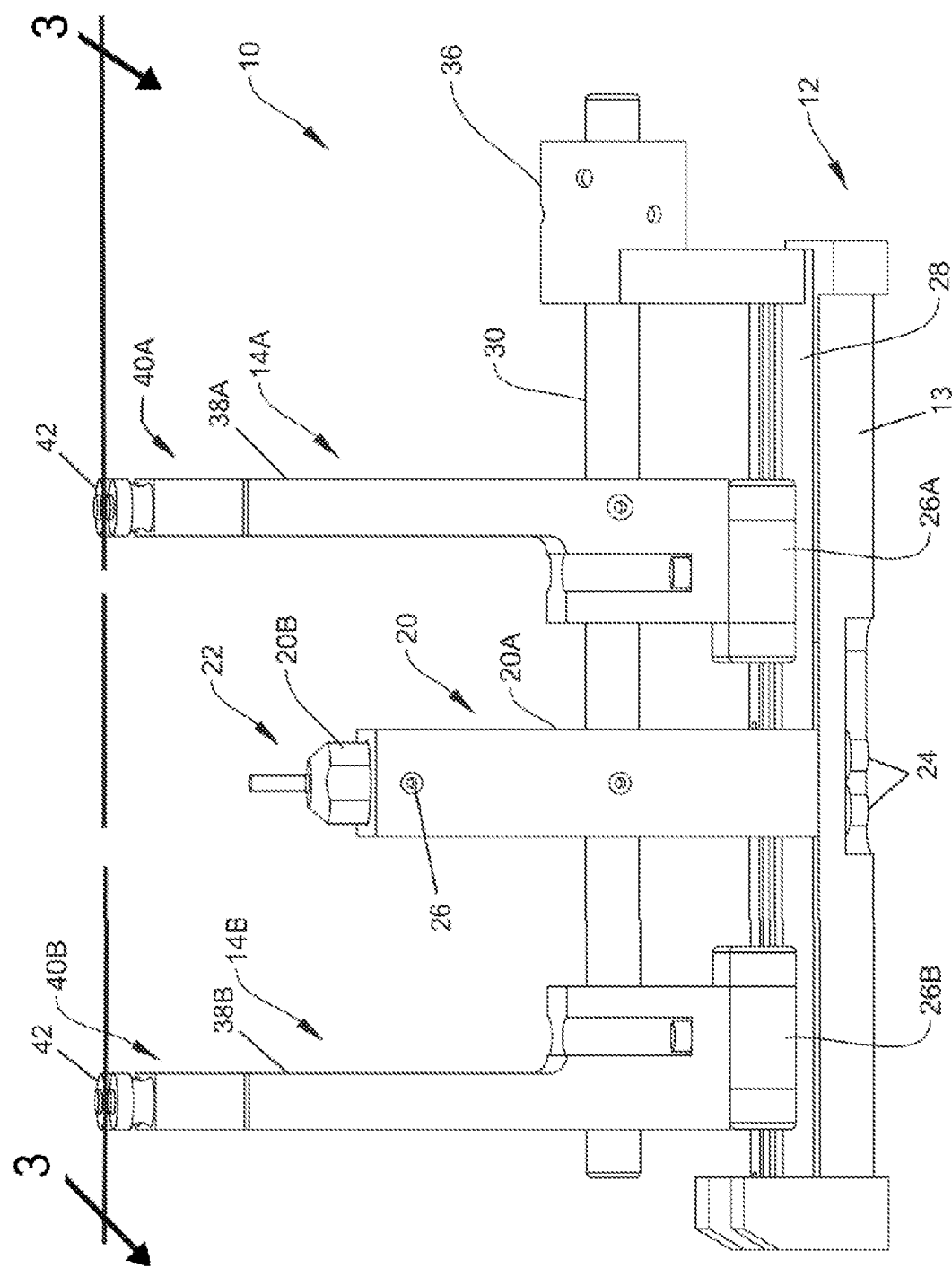
FIG. 2 is a perspective view of a support jig.
Figure 3:
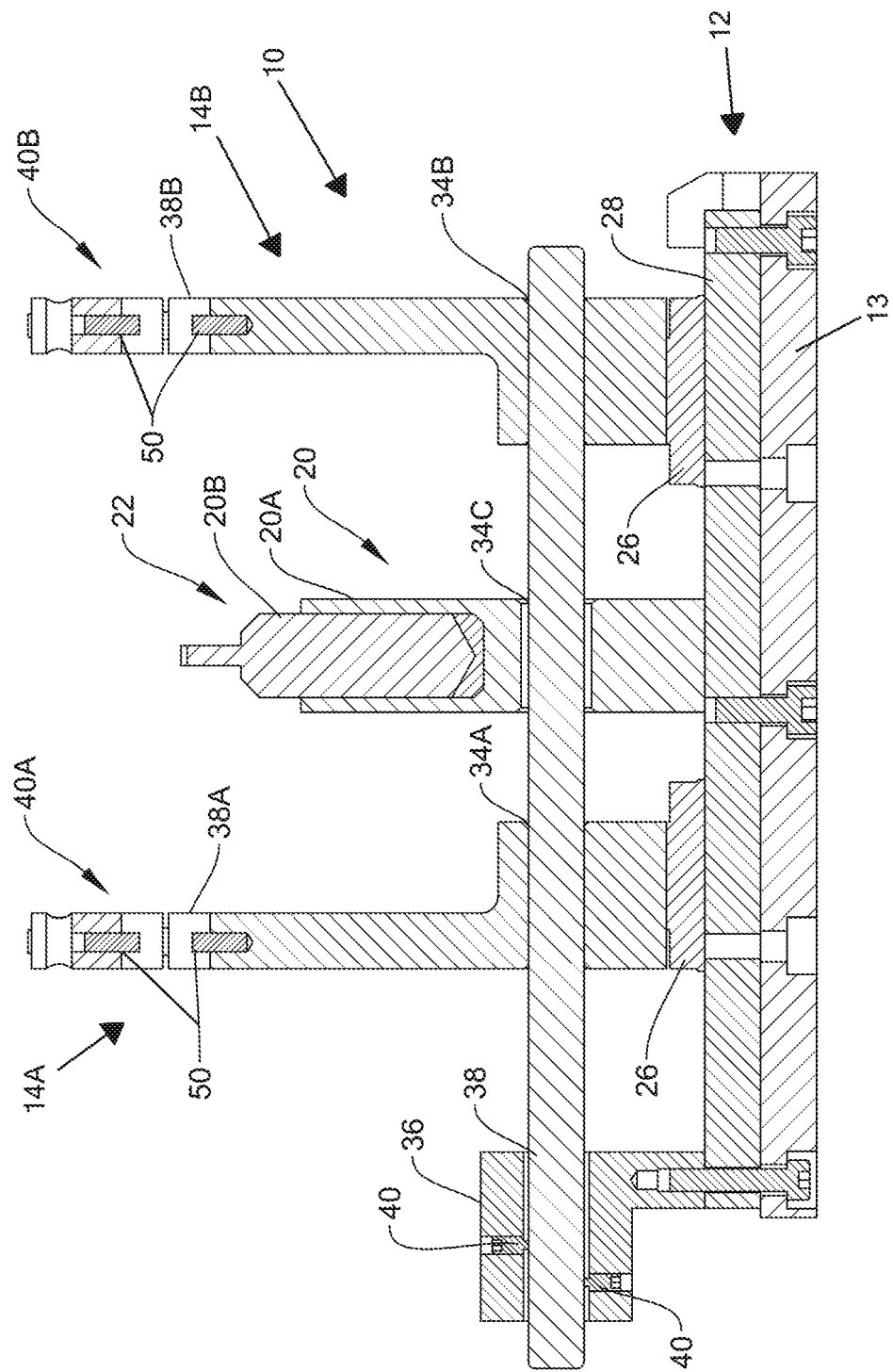
FIG. 3 is a sectional view of the support jig taken along lines 3-3 in FIG. 2.
Figure 20:
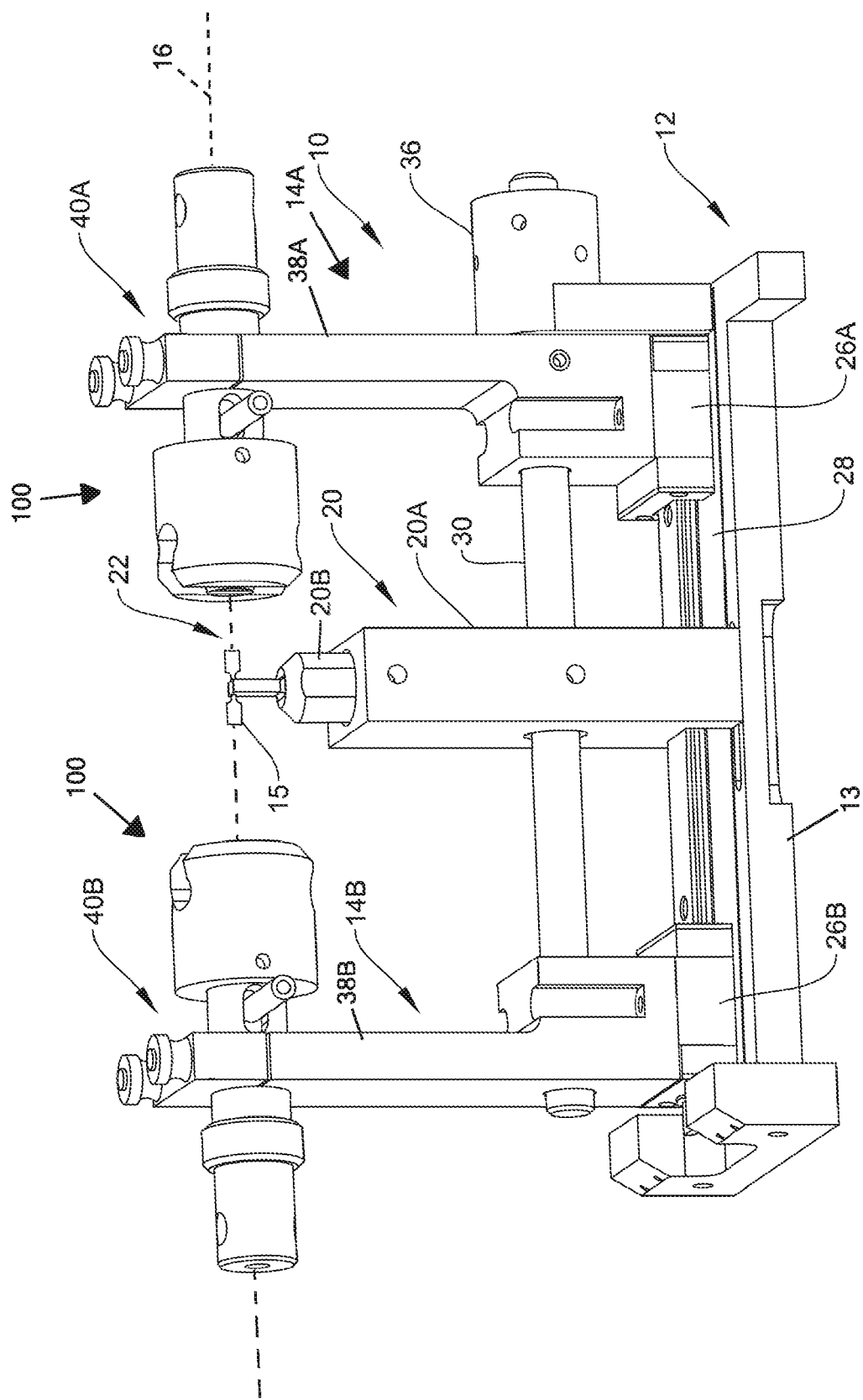
FIGS. 20-22 are perspective views of test specimen holders mounted to the support jig.

Referring to FIGS. 2 and 3, the support jig 10 includes a frame 12 having a base 13. A pair of spaced-apart supports 14A, 14B is joined to the base 13. Each support 14A, 14B is configured to releasably hold a test specimen holder on an alignment axis 16 (FIG. 20). A test specimen support 20 is joined to the frame 12 between the pair of spaced-apart supports 14A, 14B. The test specimen support 20 has an end 22 configured to hold the test specimen 15 on the alignment axis 16.

The test specimen support 20 includes a first portion 20A joined to the base 13 or frame 12 and a second portion 20B having the end 22. The second portion 20B is adjustably secured to the first portion 20A so as to adjust a position of the end 22 orthogonally with respect to the alignment axis 16. Preferably the second portion 20B is linearly adjustable with respect to the first portion 20A. In the embodiment illustrated, the second portion 20B telescopes with respect to the first portion 20A. The end 22 can include a recess of size and shape to hold the test specimen 15 on the alignment axis 16. A holding device such as a clip, clamp, tape, straps or the like can be provided on the end 22 if desired to aid in holding the test specimen 15 to the end 22. Fasteners 24 secure the test specimen support 20 to the frame 12, while a fastener 26 such as a setscrew can be used to fix the second portion 20B at a desired position with respect to the first portion 20A.

The pair of supports 14A, 14B preferably are adjustable on the frame 12 axially or parallel to the alignment axis 16 so as to adjust a position of supports 14A, 14B relative to the test specimen support 20. Preferably, each of the supports 14A, 14B is adjustably positionable on the frame 12, being mounted on a linear bearing support 26A, 26B, respectively. In a preferred embodiment, each linear bearing support 26A, 26B is mounted to a linear rail 28 with no backlash (vertical backlash in the illustrated embodiment) such that only linear movement along the rail 28 is possible.

In the embodiment illustrated, the frame 12 includes an optional alignment guide 30. Each of the supports 14A, 14B is supported by the rail 28, but the guide 30 defines the orientation of the alignment axis 16 wherein the alignment axis 16 in effect, remains parallel to the guide 30. Preferably, each of the supports 14A, 14B and the test specimen support 20 include a bore 34A, 34B, 34C, respectively, so as to receive the guide 30. The guide 30 is held in a stationary position with respect to the base 13 by a standoff 36, which in the embodiment illustrated, also includes a bore 38 to receive an end of a guide 30 while fasteners such as set screws 40 fix the guide 30 to the standoff 36.

The supports 14A, 14B move linearly with respect to the rail 28 being guided by guide 30 so as to remain in proper alignment. Once the test specimen holders 100, 200 have been mounted in each respective support 14A, 14B, and the test specimen 15 is mounted to each of the holders 100, 200, the supports 14A, 14B are fixedly secured to the guide 30 each with a corresponding fastener 33. In the embodiment illustrated, each fastener comprises a set screw for securing the position of each support 14A, 14B on the guide 30. In FIG. 2, set screw 33 secures support 14A to guide 30, while support 14B includes a similar set screw, which is on a backside of support 14B in FIG. 2. Likewise a fastener such as set screw 35 is used to secure the test specimen support 20 to the guide 30.

It should be noted that use of the guide 30 is not a requirement. In particular, the guide 30 is not necessary if the supports 14A, 14B and test specimen support 20 can be secured to rail 28 such that alignment of the supports 14A, 14B and test specimen support 20 are suitably aligned with each other along the alignment axis 16.

Figure 4:
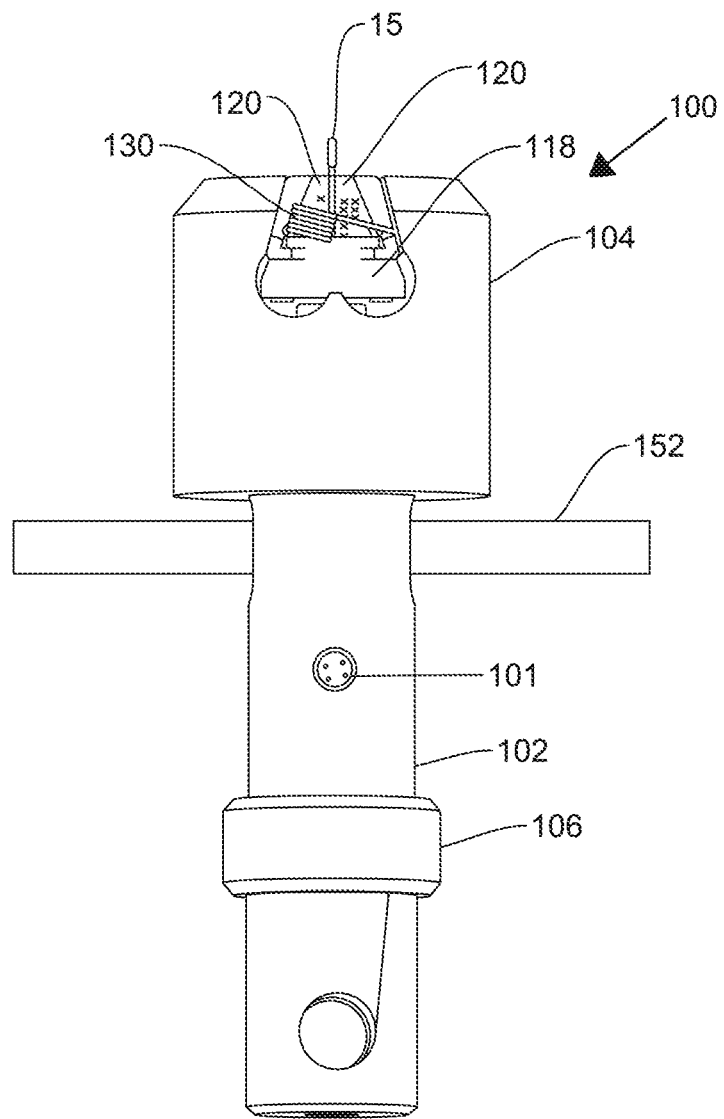
FIG. 4 is a front side elevational view of a test specimen holder.
Figure 5:
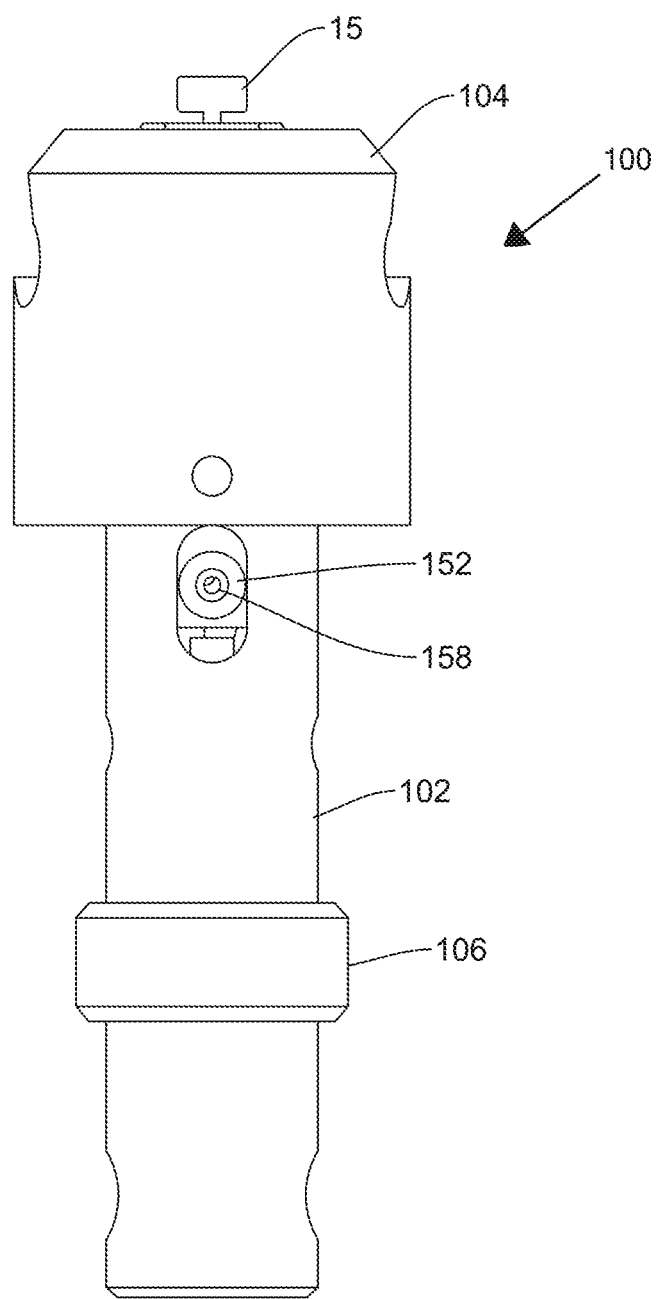
FIG. 5 is a right-side elevational view of the test specimen holder of FIG. 4.
Figure 6:
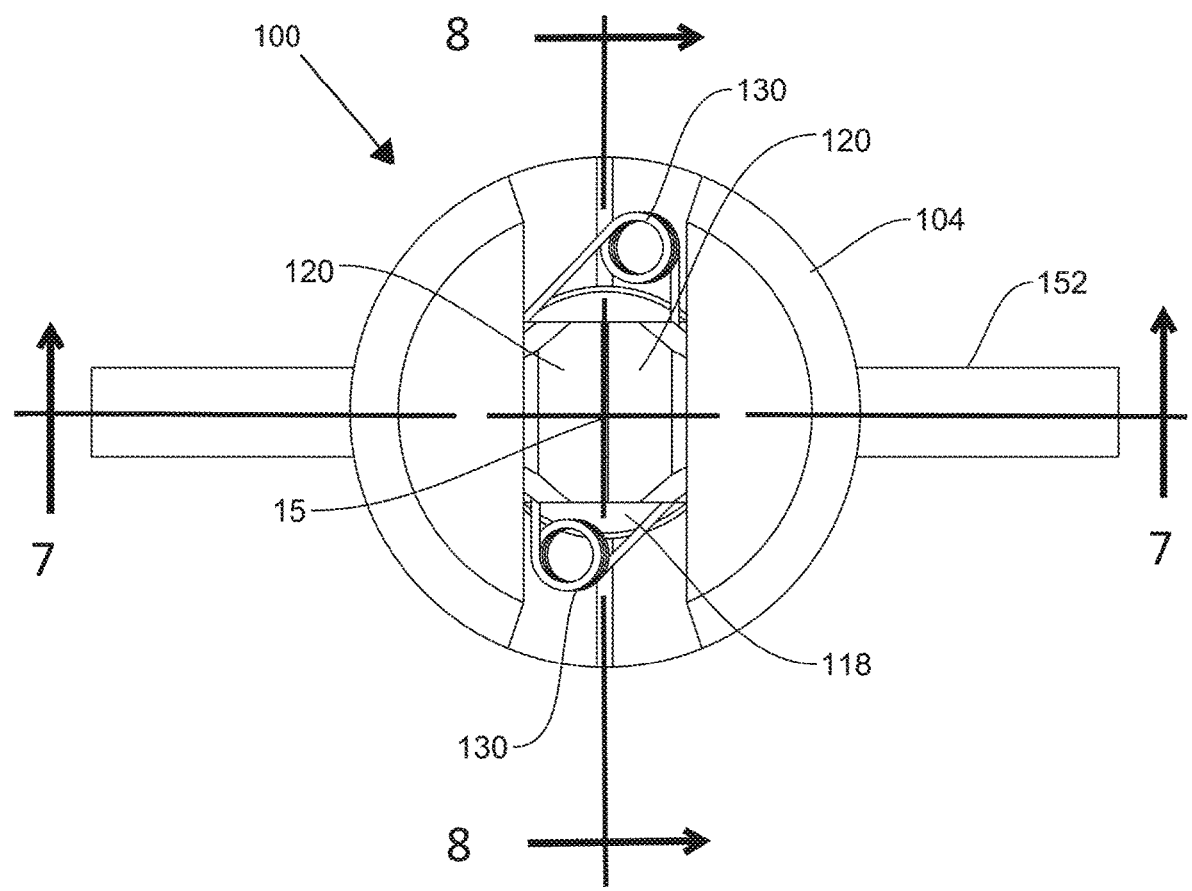
FIG. 6 is a top plan view of the test specimen holder of FIG. 4.
Figure 7:
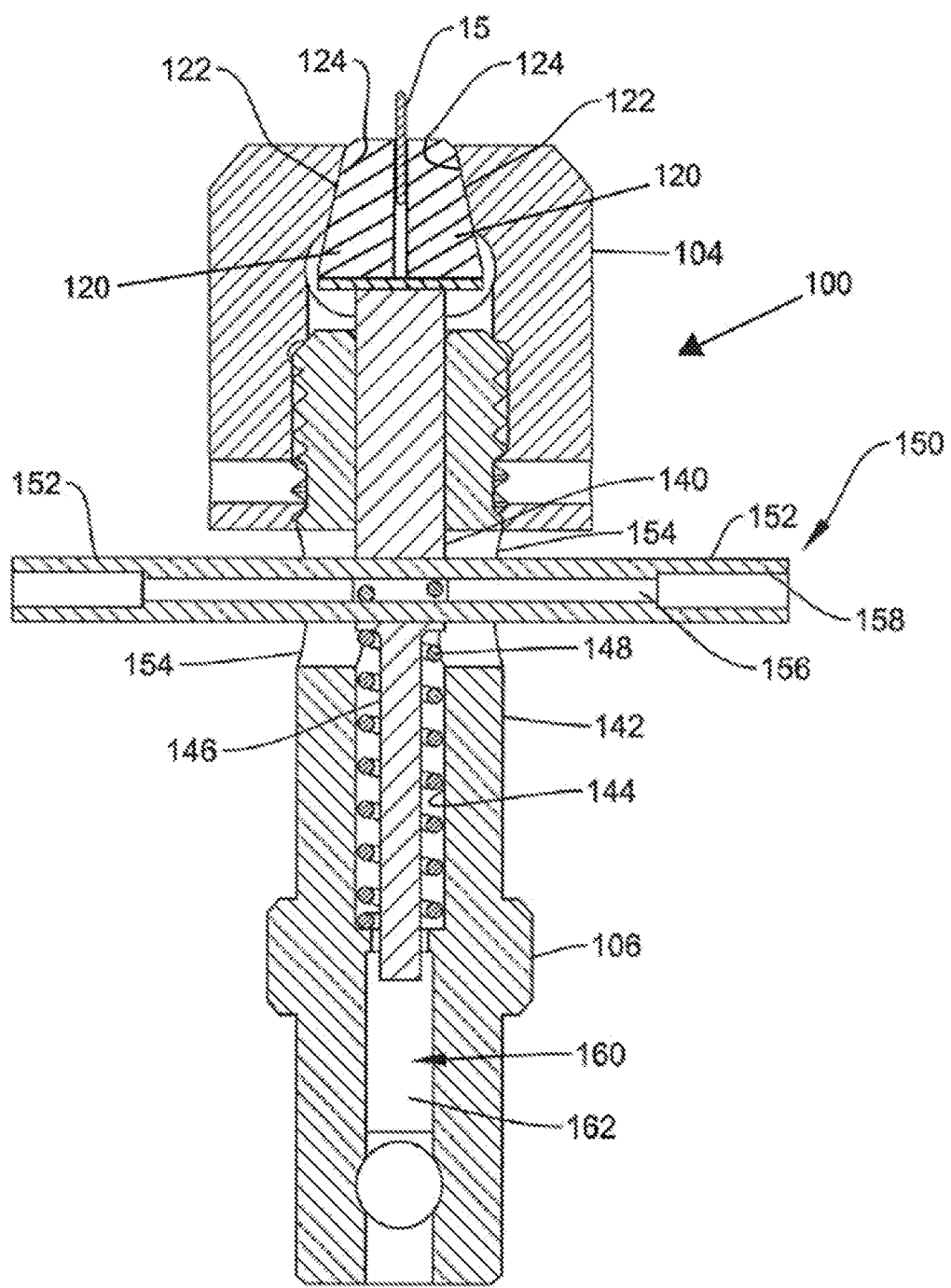
FIG. 7 is a sectional view of the test specimen holder taken along lines 7-7 of FIG. 6.
Figure 14:
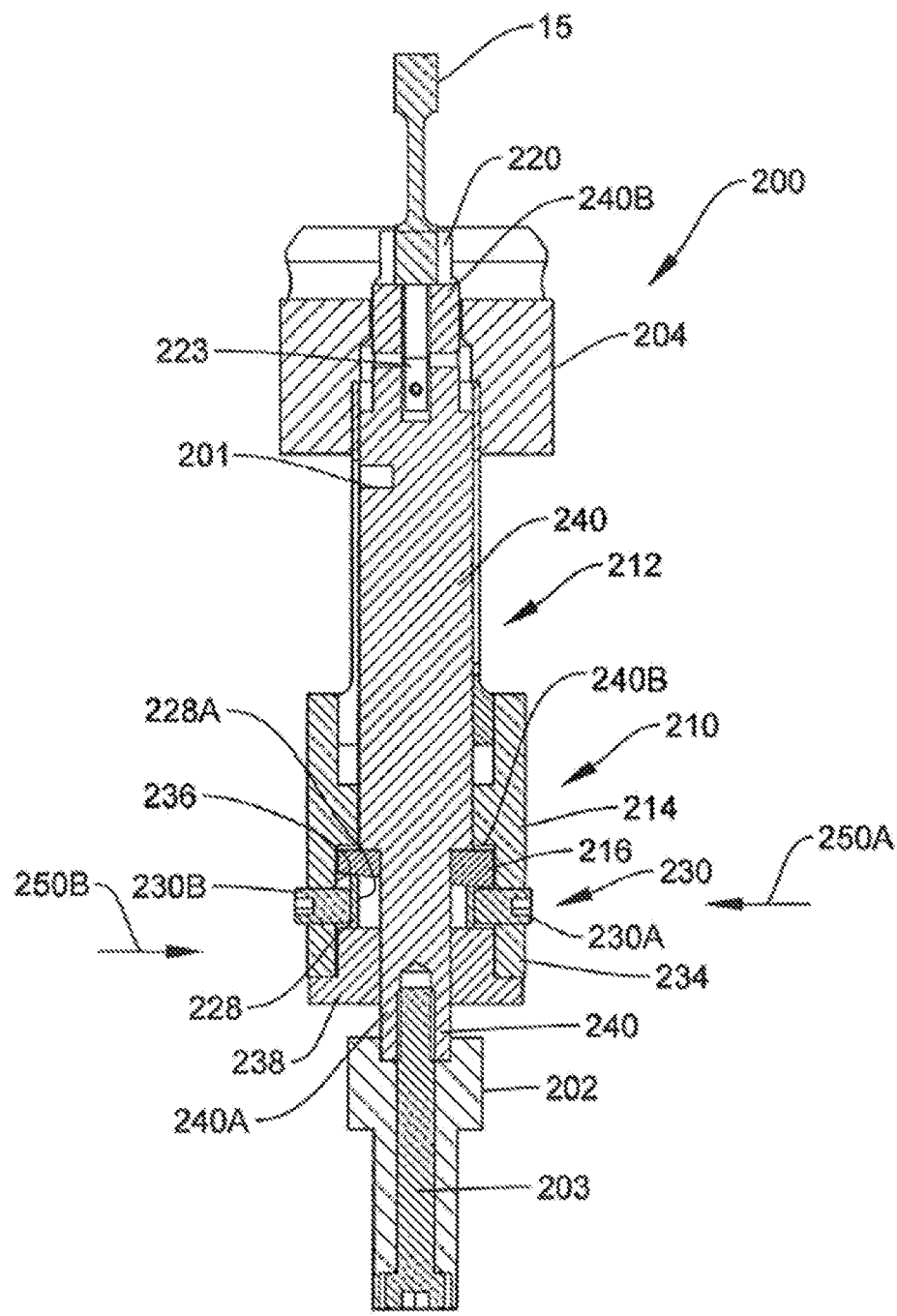
FIG. 14 is a sectional view of the test specimen holder taken along lines 14-14 of FIG. 13.
Figure 15:
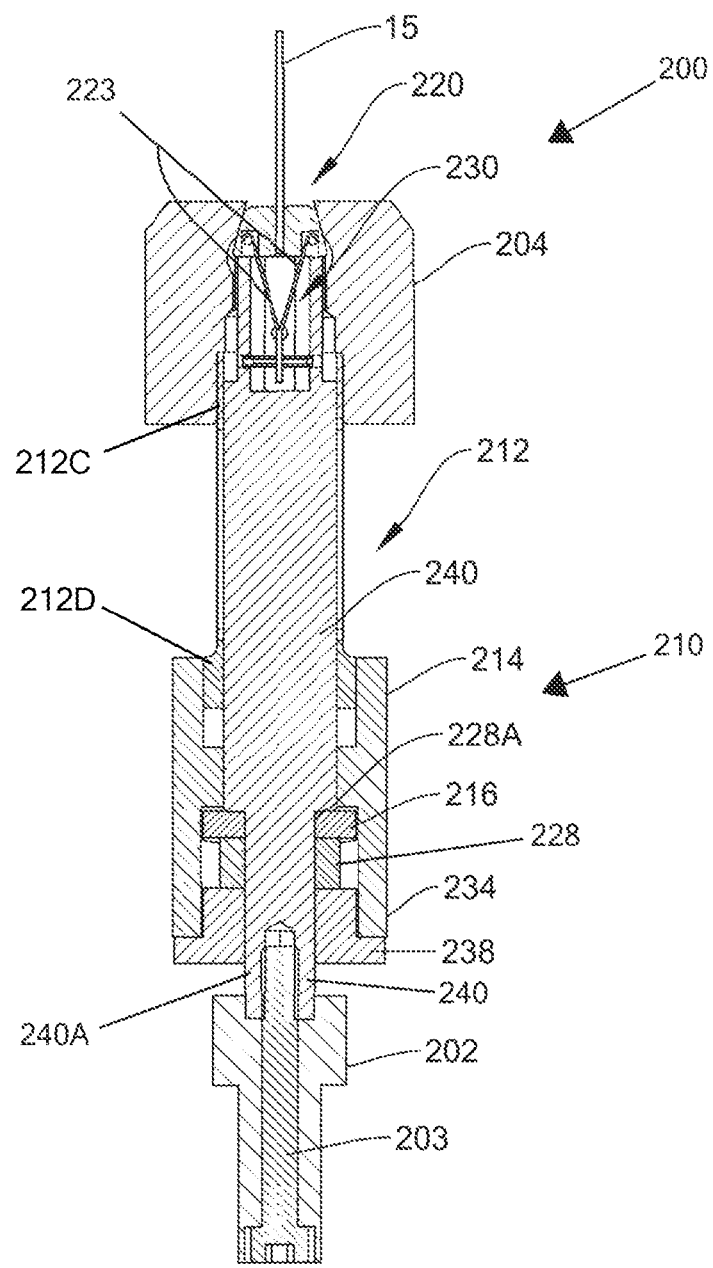
FIG. 15 is a sectional view of the test specimen holder taken along lines 15-15 of FIG. 13.
Figure 16:
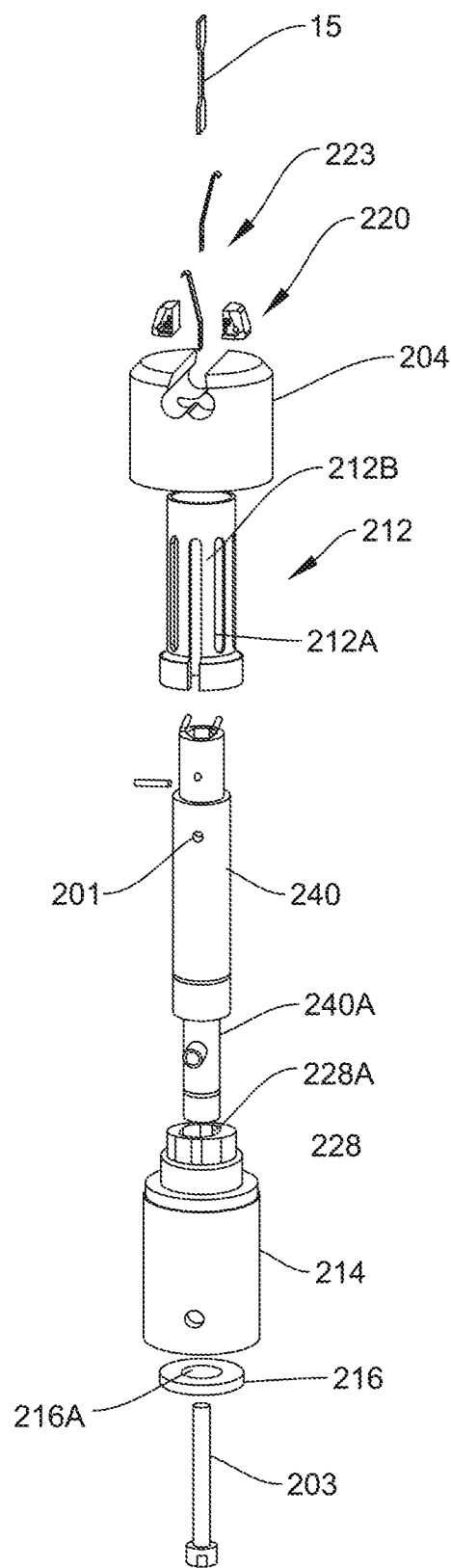
FIG. 16 is an exploded view of the test specimen holder of FIG. 13.

Herein disclosed are two different test specimen holders 100, 200 comprising other aspects of the invention. The test specimen holder 100 is generally used in tensile testing, but can be used also in fatigue testing at lighter loads. The test specimen 200 is particularly well suited for fatigue testing. Each test specimen holder 100, 200 can be used with the support jig 10. Each test specimen holder 100, 200 is releasably secured to each corresponding support 14A, 14B. Generally, each of the test specimen holders 100, 200 described below comprises a base or mount 102, 202 and a head body 104, 204 secured to the mount 102, 202 (FIGS. 4 and 14). The mount 102, 202 typically comprises a cylindrical member that can be inserted into corresponding recess provided in the test machine 1, such as a grip, and secured therein. The head body 104, 204 includes wedges that are used to hold an end of the test specimen 15 during testing.

In the embodiment illustrated, the supports 14A, 14B are releasably secured to the mounts 102, 202 of each of the test specimen holders 100, 200; however, it should be noted, if desired, the supports 14A, 14B can be configured to releasably secure to each of the head body 104, 204 of the test specimen and holders 100, 200.

Each support 14A, 14B includes a mounting aperture configured to receive a portion of the test specimen holder 100, 200. In the embodiment illustrated, the mounting aperture is formed from a portion 40A, 40B, respectively, removably secured to an end 38A, 38B of each support 14A, 14B. Surfaces of the removable portions 40A, 40B and the ends 38A, 38B together engage surfaces of the test specimen holders 100, 200. Fasteners 42 secure each removable portion 40A, 40B to its corresponding end 38A, 38B.

For test specimens having generally flat ends to which the test specimen holders 100, 200 are attached require that the test specimen holders 100, 200 be properly oriented about the alignment axis 16 so as to coincide with and properly engage the ends of the test specimen 15.

Since typically the test specimens have ends that are coplanar with each other, each of the test specimen holders 100, 200 should be oriented in the same position with respect to each other so as to orient each of the test specimen holders 100, 200 in their proper position. The supports 14A, 14B and holders 100, 200 include a protrusion-aperture connection between the supports 14A, 14B and the test specimen holders 100, 200 so as to align and also hold the test specimen holders 100, 200 in their proper rotational positions about the alignment axis 16. In the embodiment illustrated, the protrusion comprises a pin 50 (FIG. 3). The pin 50 can be securely fixed in the support 14A, 14B such as in the removable portion 40A, 40B and/or, as illustrated, in the end 38A, 38B of each support 14A, 14B. With the supports 14A, 14B having the protrusions or pins 50, the test specimen holders 100, 200 include corresponding apertures 101, 201 of size to receive a pin 50. In an alternative embodiment, the protrusion such as a pin, can be disposed on the test specimen holder 100, 200 wherein then the aperture would be provided on the supports 14A, 14B.

FIGS. 4-12 illustrate the test specimen holder 100. Generally, the test specimen holder 100 includes the mount or base 102 and the head body 104 secured to an end of the mount 102. At an end opposite the head body 104, the mount 102 is inserted into a corresponding recess provided in the test machine 1, which could comprise another, larger test specimen holder. A stop-collar 106 limits how far the mount 102 is inserted into the test machine 1.

As indicated above, it is preferable that the test specimen holder 100 be positioned in the support jig 10 where its rotational position is fixed in an accurate and repeatable manner. The protrusion-aperture described above can be used. In the embodiment illustrated, the protrusion herein comprising the pin 50 is secured to each of the supports 14A, 14B, while the aperture 101 resides in the mount 102.

Generally, the test specimen holder 100 includes movable wedges 120 that are supported by and slide on a support plate 118. Each of the wedges 120 has a specimen engaging face that faces the other wedge and engages the test specimen 15. In the embodiment illustrated, the wedges 120 are planar for use with flat test specimens; however this should not be considered limiting in that the wedges 120 can be configured to hold test specimens having other shapes such as test specimens having cylindrical ends, where for example, the wedges 120 would include notches. Together the wedges 120 engage the test specimen 15 from opposite sides. Each wedge 120 includes an inclined back surface 122. Inclined surfaces 124 of a head body 104 engage the inclined back surfaces 122 of each wedge 120 and drive or urge the wedges 120 toward each other with relative displacement between the head body 104 and the wedges 120. The use of such wedges in a head body is well-known and thus will not be further described, but it should be noted that although two wedges 120 are shown in the exemplary embodiment a single wedge or three or more wedges can be used, where each wedge commonly would engage the inclined surface 122 on the head body 104.

Figure 8:
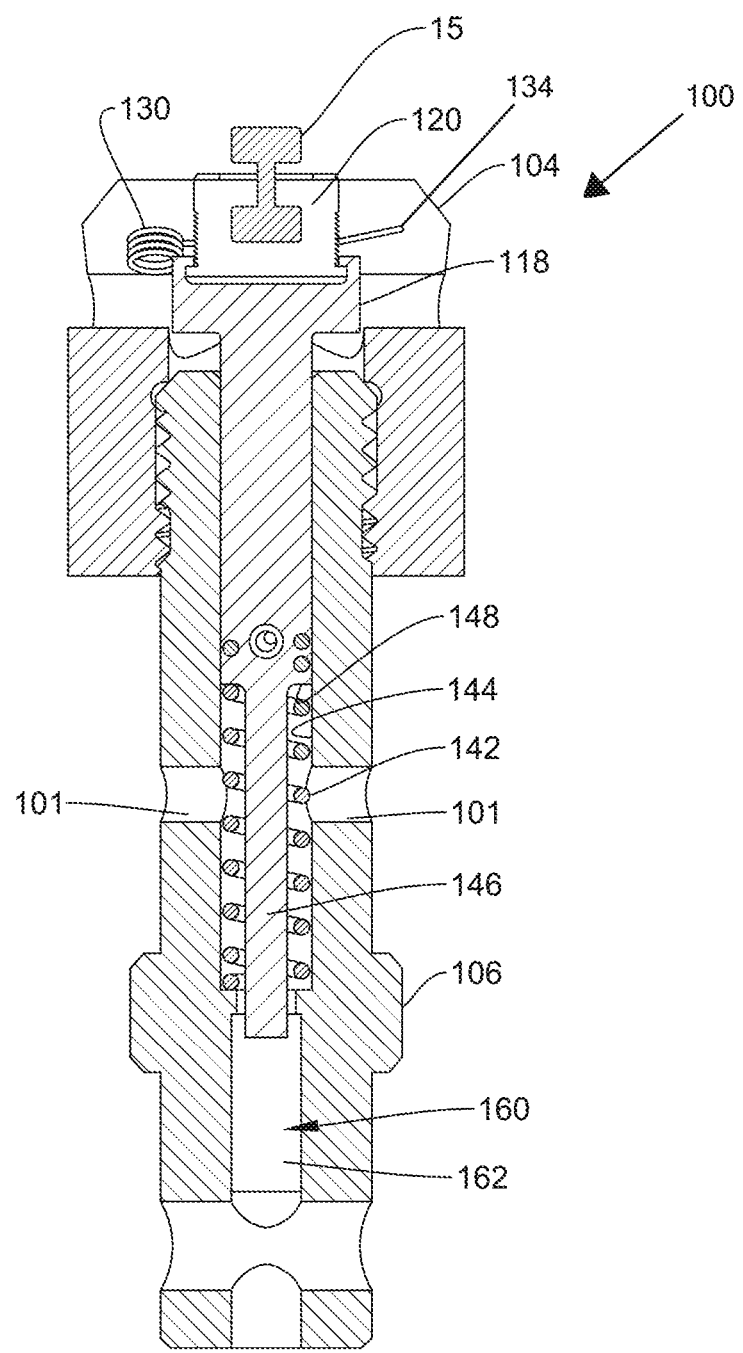
FIG. 8 is a sectional view of the test specimen holder taken along lines 8-8 of FIG. 6.
Figure 9:
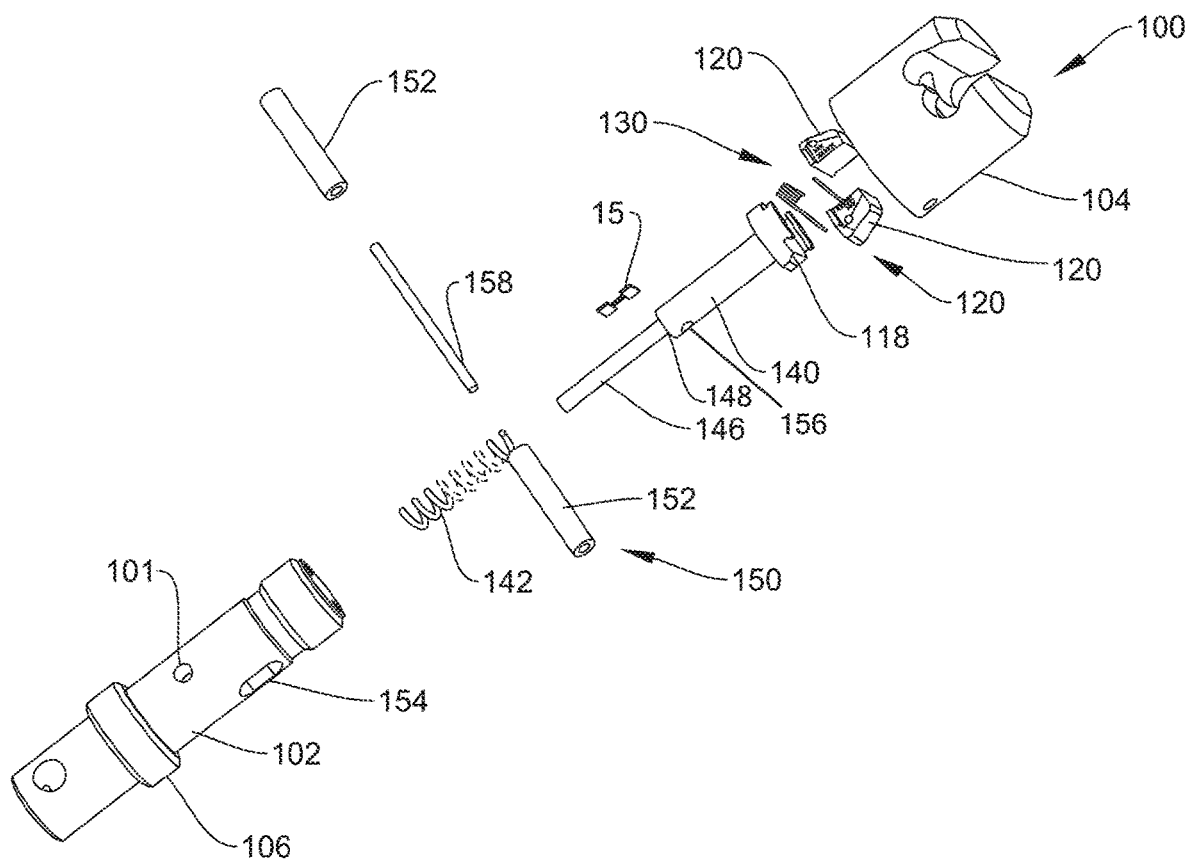
FIG. 9 is an exploded view of the test specimen holder of FIG. 4.
Figure 10:
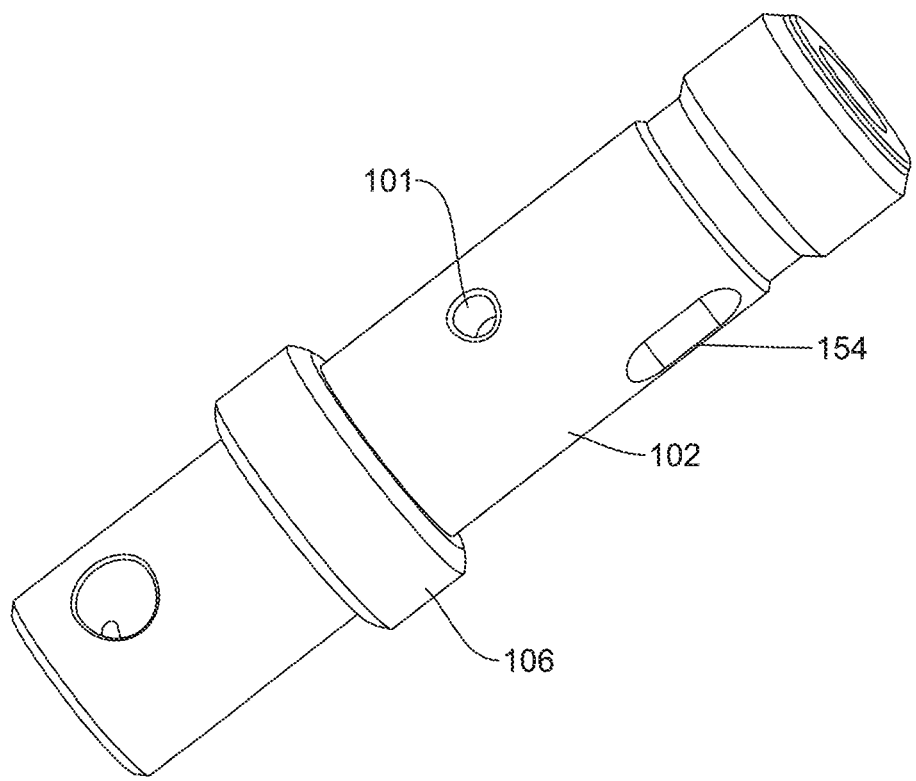
FIG. 10 is a mount for the test specimen holder of FIG. 4.
Figure 11:
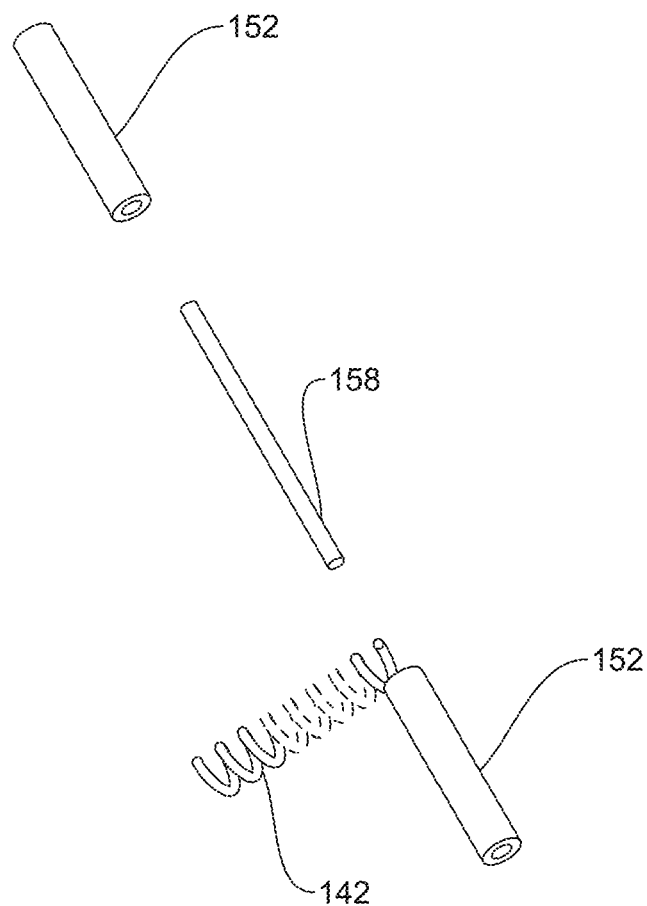
FIG. 11 is a handle for the test specimen holder of FIG. 4.
Figure 12:
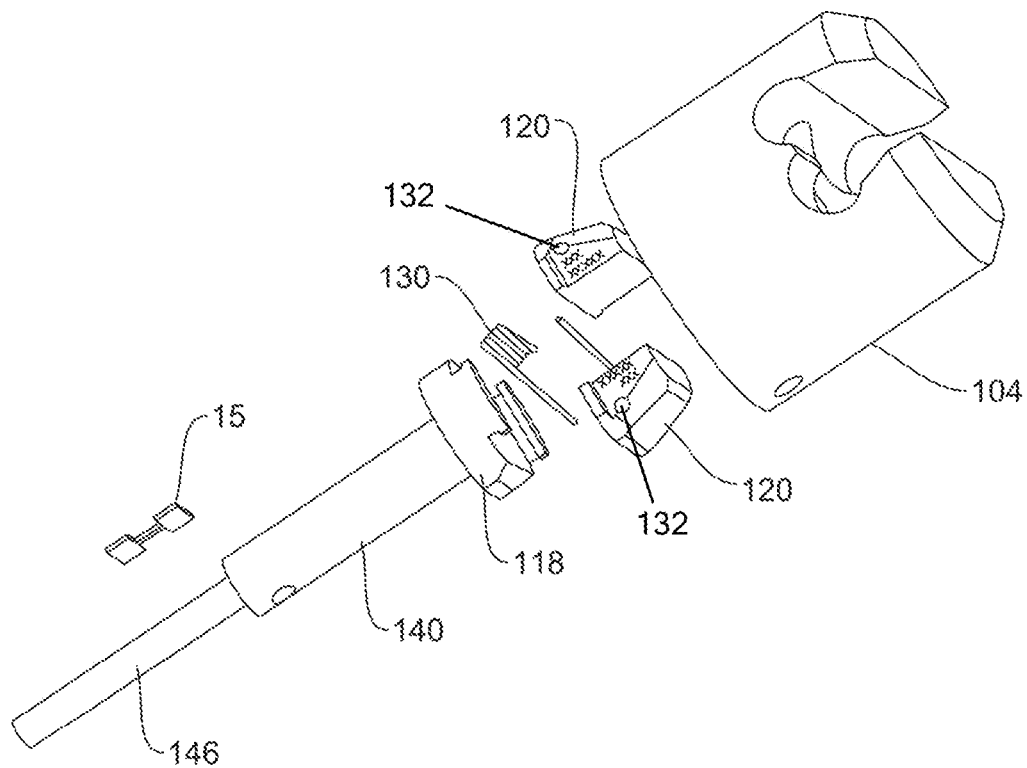
FIG. 12 is an exploded view of a portion of the test specimen holder of FIG. 4.
Figure 13:
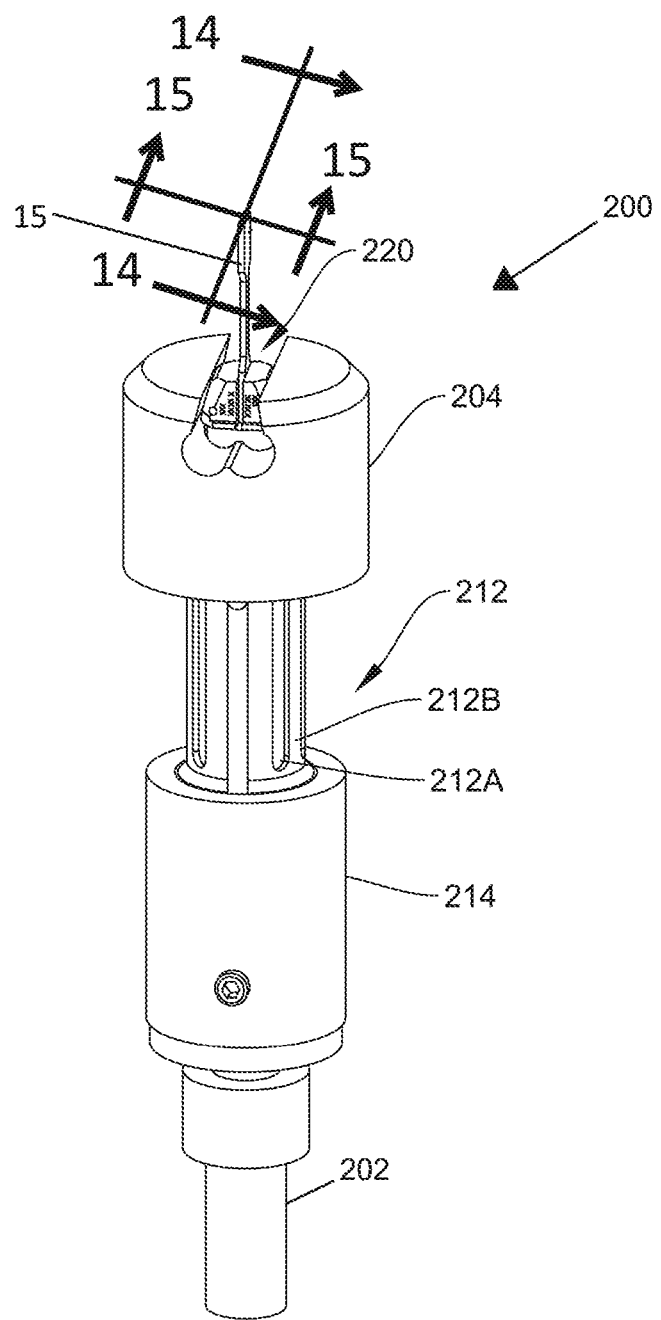
FIG. 13 is a perspective view of a second embodiment of a test specimen holder.

Springs 130 are attached to the wedges 120 and have a spring bias that drives or urges the wedges 120 away from each other so as to create a space and allow easy insertion of the ends of the test specimen 15 between wedges 120. In the embodiment illustrated, each of the springs 130 comprise a torsion spring having one end insertable into a recess or aperture 132 (FIG. 12) provided in the wedge 120 while the other end is fixedly retained by the head body 104, herein with an opposite end received in a recess or aperture 134 (FIG. 8).

The support plate 118 for the wedges 120 is mounted to a support rod or shaft 140 that extends downwardly away from the head body 104. The support plate 118 includes upstanding sides or edges that maintain the orientation of the wedges 120 so as to generally face each other but allow movement of the wedges 120 on the support plate 118 towards and away from each other. The test specimen holder 100 includes a bias spring 142 that generally biases the support shaft 140 upwardly towards the head body 104 so as to urge the wedges 120 towards each other and to engage the end of the test specimen located therebetween. The bias spring 142 herein is a coil spring received in a bore 144 provided in the mount 102. The support shaft 140 includes an extending portion 146 having a width allowing it to be inserted into the coils provided in the bias spring 142. A flange 148 is provided in the support shaft 140 that engages the uppermost coil of the bias spring 142.

A handle 150 secured to the support shaft 140 allows the support shaft 140 to be pulled away from the head body 104 and against the bias spring 142 so as to allow the wedges 120 to open due to the spring force provided in the springs 130 that urge the wedges 120 away from each other. In the embodiment illustrated, the handle 150 has portions 152 that extend in opposite directions through slots 154 provided in the mount 102. The handle portions 152 are secured to the support shaft 140 where the support shaft 140 includes a bore 156 of size to receive a handle shaft 158 therein. Generally the forgoing design allows the handle 150 to be pulled downwardly away from the head body 104 where the torsion springs 130 thereby urge the wedges 120 away from each other so as to allow the test specimen end to be insert therebetween. When the handle 150 is released, a clamping force is generated and applied to the end of the test specimen 15.

In the embodiment illustrated, a preload clamp force adjuster 160 (FIGS. 7, 8) is provided to apply a force that further urges the wedges 120 toward each other so as to apply a preload clamping force upon the end of the test specimen 15. The adjuster 160 includes an actuator 162 that urges the support shaft 140 toward the head body 104 so as to urge the wedges 120 toward each other. The adjuster 160 comprises a drive screw that abuts the end of the shaft 140 and is threadably connected to a threaded bore in the mount 102.

The test specimen 15 is secured to the test specimen holder 100 in two steps. First, the handle 150 is pulled down against the bias spring 142, which causes the wedges 120 to separate allowing the test specimen 15 to be located between the wedges 120. When the handle is released, the wedges 120 contact and hold the test specimen 15 from the force provided by the bias spring 142. The actuator 160 is then operated, herein by rotation of it being a drive screw to further urge the shaft 146 toward the head 104, thereby driving the wedges 120 toward each other and against the test specimen 15.

The second test specimen holder 200 is illustrated in FIGS. 13-19. The test specimen holder 200 includes the mount 202 and head body 204 and wedges 220. The wedges 220 and head body 204 operate in the same manner as wedges 120 and head body 104 where inclined back surfaces on the wedges 220 slide upon inclined surfaces in the head body 204 so as to cause transverse movement of the wedges 220 toward each other.

The mount 202 is connected to a support shaft 240 on a first end 240A with a fastener 203, while a second end 240B supports the first and second wedges 220. A drive 210 supported by the support shaft is located between the first end 240A and the second end 240B. A spring 212 is connected, for example threadably, to the head body 204 at a first end and to the drive 210, for example threadably, at a second end to cylindrical a first portion 214.

The drive 210 is configured to pull upon the spring 212 so as to displace the head 204 downward axially relatively to the shaft 240. Downward movement of the head 204 urges the wedges 220 toward each other. The test specimen 15 is secured to the test specimen holder 200 also in two steps. First with the threaded connection between the spring 212 and the first portion 214 at a minimum so as to allow the head 204 to be displaced upwardly away from the end of the shaft 240, the wedges 220 are sufficiently away from each other to allow the test specimen to be inserted between the wedges 220. Springs 223 urge the wedges 220 against the inclined surfaces of the head 204 so as to cause the wedges 220 create a space so as to allow insertion of the test specimen 15. In this embodiment, each of the springs 223 are elongated with a first end fixedly joined to the support shaft 240 and second end to the wedge 220.

The first portion 214 is then rotated about the shaft 240 so as to increase the threaded connection between the first portion 214 and the spring 212. This pulls the spring 212 and head downwardly so that the wedges 220 are urged toward each other and against the test specimen 15, where the spring 212 provides a spring force.

To further increase the clamping force of the wedges 220 the drive 210 includes an actuator or displacement mechanism to further displace the first portion 214 axially downwardly. The actuator mechanism includes a driven part 228 in contact with and moveable relative to the first portion 214 and a second portion 216. In the embodiment illustrated, the driven part 228 is moveable, herein transversely, toward and away from a longitudinal axis of the support shaft 240. An actuator 230 supported by the first portion 214 is in engaging contact with the driven part 228. The actuator 230 moves toward and away from the longitudinal axis, preferably being arranged transversely with respect thereto. In the embodiment illustrated, the actuator 230 can comprise a drive screw threadably engaging the first portion 214. Engaging surfaces of the driven part 228 and second portion 216 include an inclined surface on at least one of the driven part 228 and/or second portion 216, and in a preferred embodiment, each of the driven part 228 and the second portion 216 include inclined surfaces engaging each other. A wall 234 can form a chamber 236 about the support shaft 240 wherein the driven part 228 and second portion 216 are disposed in the chamber 236. An end cap 238 is joined to an end of the wall 234 so as to capture the driven part 228 and second portion 216 in the chamber 236 and maintain the driven part 228 in contact with the second portion 216. The second portion 216 can be fixedly secured to the support shaft 240 and in one embodiment being integrally formed therewith being formed from a single unitary body. In an alternative embodiment, as illustrated, the second portion 216 is separable from the support shaft 240 and can comprise a disc shaped element having an aperture 216A through which a portion 240A of the support shaft 240 extends therethrough. In such a configuration, the second portion 216 engages an annular flange 240B provided on the support shaft 240 so as to provide a reaction structure.

With the second portion 216 comprising a disc element, the driven part 228 can also be formed as a disc having an aperture 228A through which the portion 240A of the support shaft 240 extends therethrough. The aperture 228A, however, comprises a slot with a longitudinal axis being transverse to the longitudinal axis of the support shaft 240. The slotted aperture 228A allows the driven element 228 to move transversely with respect to the longitudinal axis of a support shaft 240. In the embodiment illustrated, the actuator 230 comprises two separate actuators 230A, 230B wherein a first actuator 230A drives the driven part in the direct indicated by arrow 250A while a second actuator 230B is used to drive the drive element 228 in the opposite direction by arrow 250B. One or both of the actuators 230A, 230B can comprise a threaded element threadably engaging the first portion 214.

To increase the clamping force of the wedges 220 upon the test specimen 15, the actuator 230 is operated to displace the driven element 228. In the embodiment illustrated due to the inclined surfaces on the second portion 216 and driven element 228, movement of the actuator 230B in the direction of arrow 250B further displaces the cylindrical first portion 214 downwardly with respect to the shaft 240, thereby increasing the tension in the spring 212 and pulling the head 204 downwardly. When the test specimen is to be removed, the actuator 230B is moved in the direction of arrow 250A, and then the actuator 230A is also operated to drive the driven element 228 in the direction of arrow 250A, allowing the cylindrical portion 214 to move axially upwardly. The cylindrical portion 214 can then be rotated to minimize the threaded connection of the spring and the cylindrical portion 214 sufficiently so the wedges 220 separate and allow removal of the test specimen 15.

Figure 17:
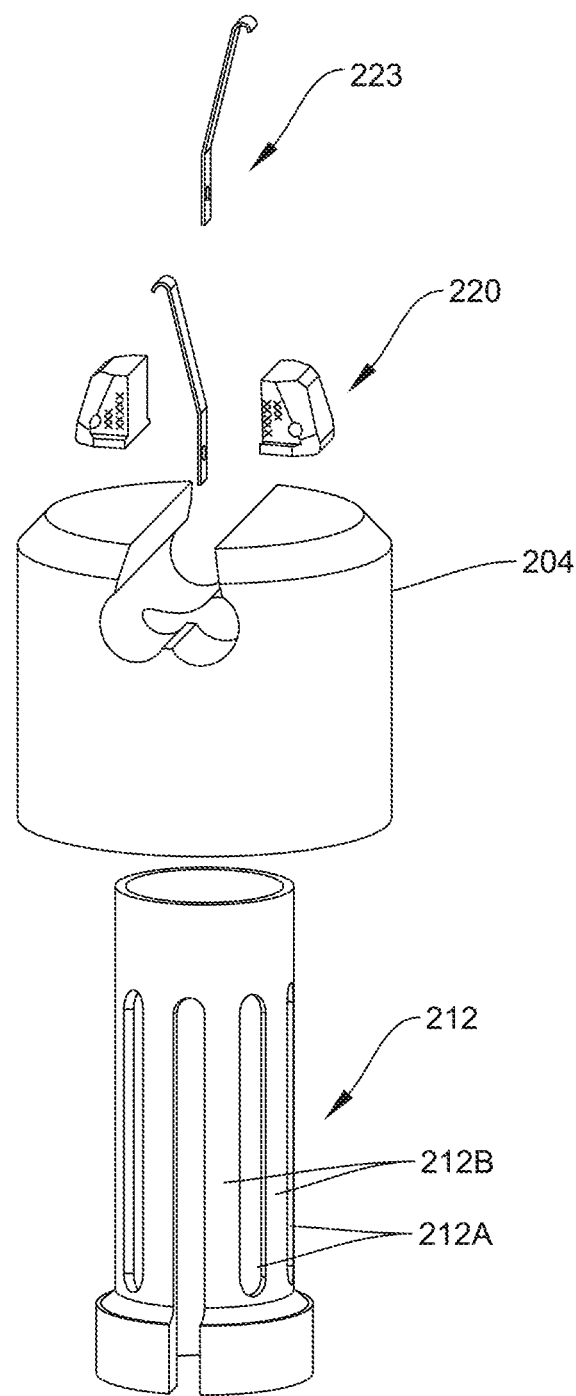
FIGS. 17-19 are exploded views of portions of the test specimen holder of FIG. 13.
Figure 18:
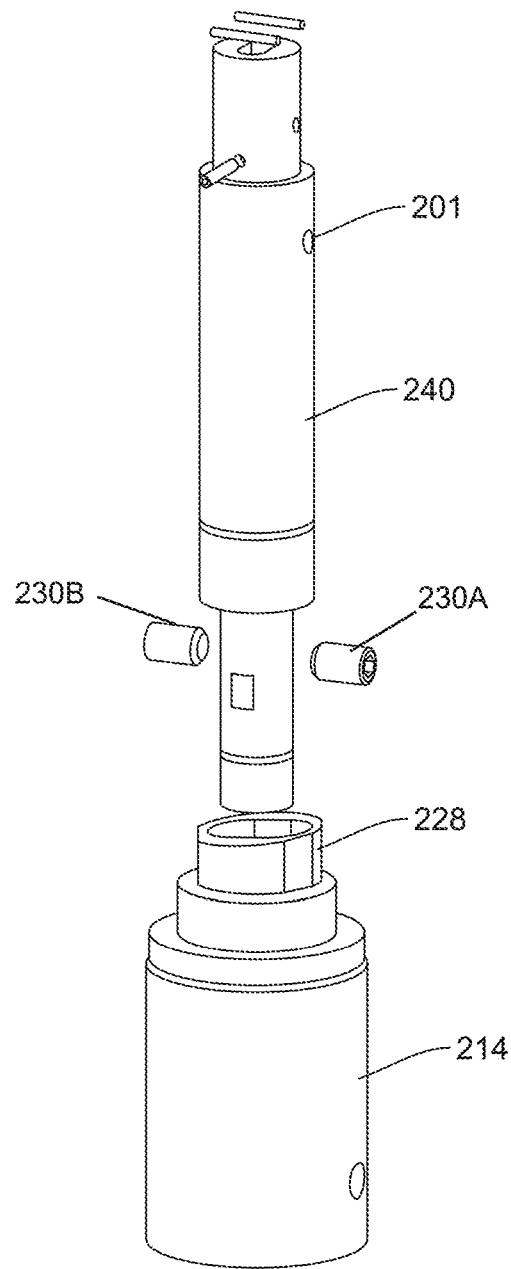
Figure 19:
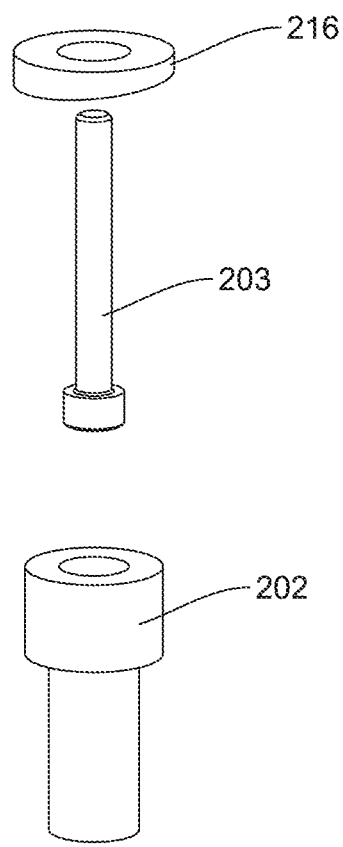

Referring to FIG. 17, the spring 212 can comprise a plurality of longitudinal spring elements disposed about the support shaft 240. In the embodiment illustrated, the spring 212 comprises a cylindrical body having longitudinal slots 212A wherein the spring elements are portions 212B of the cylindrical body located between successive longitudinal slots 212A. In one embodiment, the spring 212 is threadably joined to the head body 204 at a first end 212C and threadably joined to the drive 210 at a second end 212D.

Like the test specimen holder 100 described above, the aperture 201 is provided to receive the pin 50 of the support jig 10. The pin 50 can be disposed between two successive longitudinal spring elements such as being disposed through one of the slots 212A provided in the cylindrical body.

A method of using the test specimen holders, such as but not limited to holders 100, 200, with the support jig 10 comprises preferably, positioning the support jig 10 on a work surface remote from the test machine 1; securing the selected specimen holders to the supports 14A, 14B, preferably using the protrusion-aperture connection between the specimen holders and the supports 14A, 14B; locating the test specimen 15 in the specimen holders, herein with the exemplary holders 100, 200 by opening the corresponding wedges of each of the test specimen holders 100, 200 so as to locate ends of the test specimen 15 between the wedges. After the test specimen 15 is mounted to each of the specimen holders and the supports 14A, 14B have been secured to the jig 10 so that all or substantially all force loads between the specimen holders 100, 200 are transferred through the jig 10, thereby protecting the test specimen 15 from seeing such forces, the specimen holders 100, 200 can be mounted in the test machine 1, and once secured, the support jig 10 can then be removed.

In one embodiment, the method further includes allowing the supports 14A, 14B to move freely on the frame 12 of the support jig 10 during loading of the specimen end, and then securing the support 14A, 14B in a fixed position relative to the frame of the support jig 10, or to the optional guide 30.

Figure 21:
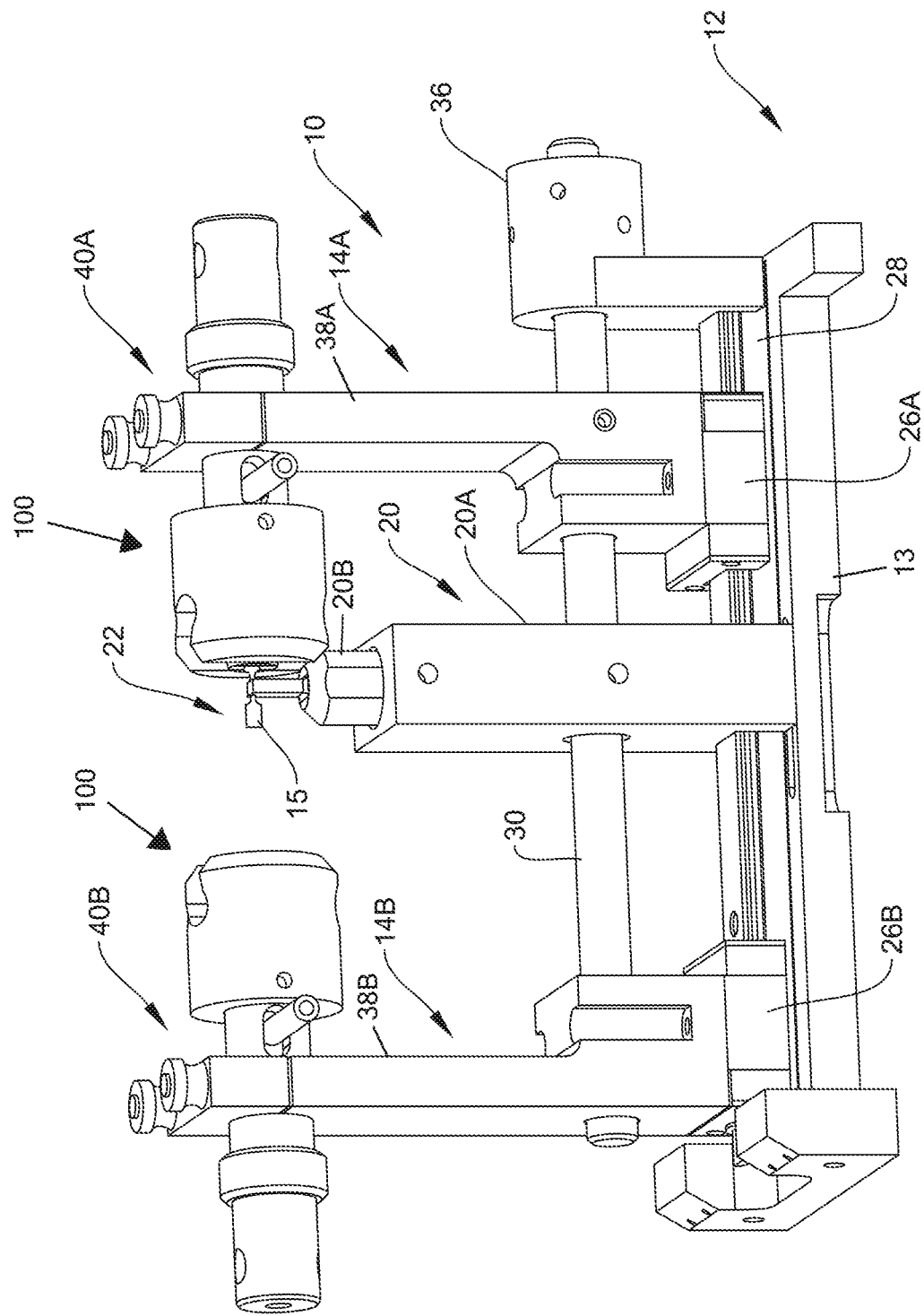

With reference to FIG. 20 and the test specimen holders 100, installing the test specimen 15 is as simple as placing it in one of the holders 100, while opening the wedges 120 with the handle 150, and releasing the wedges 120 on the test specimen 15 as illustrated in FIG. 21. The test specimen holder 100 is brought toward the other end of the test specimen 15 and secured to it in the same manner to achieve the setup shown in FIG. 22. Each actuator 160 of each holder 100 is then operated so as to increase the clamp forces upon the test specimen 15 as well as provide a solid load path from the wedges 120 to the mount 102. The test specimen 15 is now installed in the holders 100. The set screws of the supports 14A and 14B can be operated so as to secure the supports 14A and 14B to the rail 28 and/or the guide 30, if provided. Specimen alignment in the test specimen holders can be verified through various means-mechanical measurement, optical measurement via light/shadow, lasers, and cameras. Other means of verification like photo elastic paint could also be used.

Figure 23:
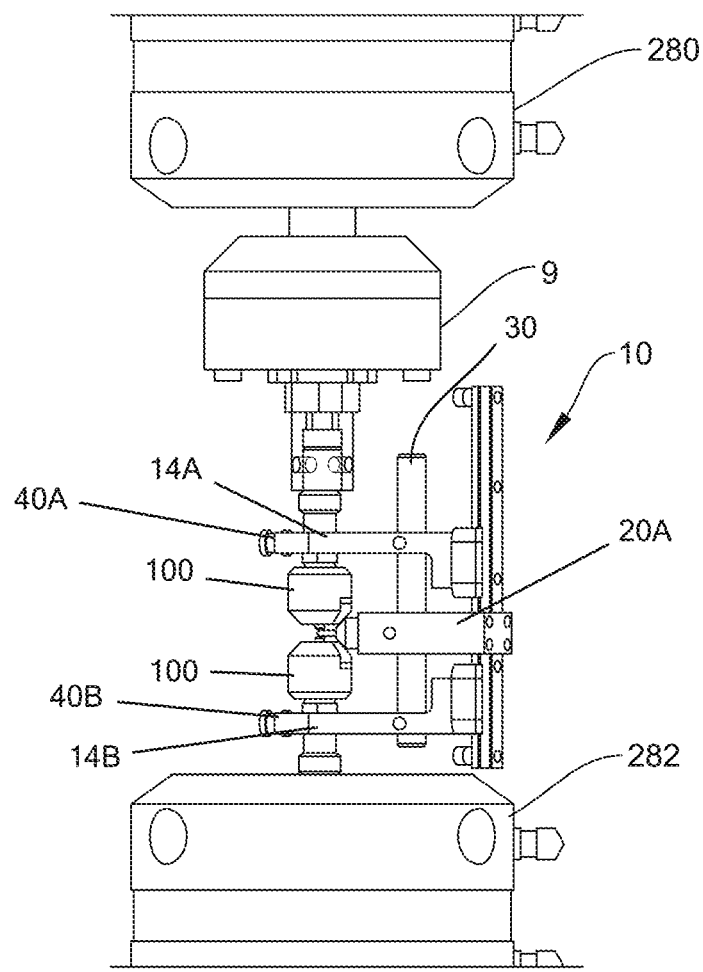
FIG. 23 is an elevational view of the test specimen holders and support jig installed in the test machine.

Referring to FIG. 23, the jig 10 with the specimen holders (e.g. 100) and test specimen 15 are transferred to the test machine 1. In FIG. 23, optional intermediate holders 280, 282 are used. In the embodiment illustrated, the upper test specimen holder is mounted to the load cell 9 that in turn is mounted to intermediate holder 280, the intermediate holder 280 being mounted to an actuator if present in the crosshead 8, or to the crosshead 8 directly. Similarly, the lower specimen test holder is mounted to lower intermediate holder 282 that is mounted to the actuator 3 or to a test machine base through a load cell if provided.

In the exemplary test machine 1 of FIG. 23, one mount of the test specimen holders 100 is installed in the test machine 1 for example with a direct connection via a clevis pin to the load cell 9. After installing one end, the test machine 1 can be operated so as to position the other end, for example, having grip 282 so as to grasp the end of the other test specimen holder 100. After mounting, preferably, the test machine 1 is placed in force control and operated so that zero force is being applied between the test specimen holders 100. With zero force applied, the jig 10 can then be removed and the test machine 1 is now ready to conduct a test upon the test specimen. Reverification of specimen alignment in the test specimen holders can again be verified through various means-mechanical measurement, optical measurement via light/shadow, lasers, and cameras. Other means of verification like photo elastic paint could also be used.

Although the subject matter has been described in language directed to specific environments, structural features and/or methodological acts, it is to be understood that the subject matter defined in the appended claims is not limited to the environments, specific features or acts described above as has been held by the courts. Rather, the environments, specific features and acts described above are disclosed as example forms of implementing the claims.

What is claimed is:

1. A support jig for use with a testing machine applying loads to a test specimen, the support jig comprising:
    a frame;
    a pair of spaced apart supports joined to the frame to provide an alignment axis, each support configured to releasably hold a test specimen holder on the alignment axis in a fixed spatial relationship with ends of the test specimen holders mountable to the test machine facing in opposite directions; and
    a test specimen support joined to the frame between the pair of spaced apart supports, the test specimen support having an end configured to hold the test specimen on the alignment axis.

2. The support jig of claim 1 wherein the test specimen support comprises a first portion joined to the frame and a second portion having the end, the second portion adjustably secured to the first portion so as to adjust a position of the end orthogonally with respect to the alignment axis.

3. The support jig of claim 2 wherein the second portion is linearly adjustable with respect to the first portion.

4. The support jig of claim 1 and a fastener to secure the test specimen support to the frame.

5. The support jig of claim 1 wherein the end comprises a recess configured to receive a test specimen.

6. The support jig of claim 1 wherein the pair of supports comprise a first support and a second support, and wherein the first support is adjustably positionable on the frame to axially adjust a position of the first support on the alignment axis.

7. The support jig of claim 6 wherein the second support is adjustably positionable on the frame to axially adjust a position of the second support on the alignment axis.

8. The support jig of claim 1 wherein each support includes a recess or protrusion spaced apart from the alignment axis that is complimentary to a protrusion or recess, respectively, provided on the associated test specimen holder securable to the support.

9. The support jig of claim 1 wherein each support provides a mounting aperture for receiving a portion of the test specimen holder.

10. The support jig of claim 1 wherein an end of each support includes a removable portion securable to the end.

11. The support jig of claim 10 wherein the end of each support and the removable portion include surfaces engageable with the test specimen holder that are complimentary with the test specimen holder.

12. The support jig of claim 1 and further comprising a first test specimen holder removably securable to one of the supports and a second test specimen holder removably securable to the other of the supports.

13. The support jig of claim 12 wherein the first test specimen holder and the second test specimen holder each include a head configured to hold an end of the test specimen and a base attached to the head, the base having each end configured for mounting to the test machine.

14. The support jig of claim 13 wherein each end of each support is configured to releasably engage an outer surface of the base of each corresponding test specimen holder.

15. The support jig of claim 14 wherein each of the test specimen holders includes a mechanism to apply a preload clamping force to the end of the test specimen.

16. The support jig of claim 12 wherein each of the first and second test specimen holders includes movable jaws to engage and hold an end of the test specimen.

17. A method for loading a test specimen in a test machine having a first test specimen holder and a second test specimen holder, the method comprising:
providing a support jig remote from the test machine, the support jig having a frame with a first support spaced apart from a second support;
mounting the first test specimen holder to the first support and the second test specimen holder to the second support so that heads, configured to hold ends of the test specimen, face each other and ends of the test specimen holders, securable to the test machine, face in opposite directions, the test specimen holders being aligned with each other and located on a common alignment axis;
mounting the test specimen to a test specimen support, the test specimen support being joined to the frame between the spaced apart first and second supports, the test specimen support having an end configured to hold the test specimen on the alignment axis;
securing the heads of the first and second test specimen holders to first and second ends, respectively, of the test specimen; and
mounting the first test specimen holder and the second test specimen holder in the test machine wherein the support jig holds the first test specimen holder and the second test specimen holder on the alignment axis and in a fixed spatial relationship relative to each other.

18. The method of claim 17 wherein mounting the test specimen to the test specimen support so as to be aligned with the alignment axis occurs before securing the heads of the first test specimen holder and the second test specimen holder to the test specimen.

19. The method of claim 17 wherein mounting the first test specimen holder and the second test specimen holder in the test machine occurs after mounting the first test specimen holder and the second test specimen holder to the support jig and/or securing heads of the first and second test specimen holders to test specimen.

20. The method of claim 17 wherein mounting the first test specimen holder and the second test specimen holder to the support jig includes fixing a rotational position of each of the first test specimen holder and the second test specimen holder about the alignment axis.

21. The method of claim 17 wherein securing heads of the first and second test specimen holders to first and second ends, respectively, of the test specimen includes applying a preload clamping holding force to end of the test specimen.

22. A test specimen holder comprising;
a head body having a first inclined body surface and a second inclined body surface facing each other;
a first and second wedge located in the head body, the first wedge having a first inclined wedge surface in sliding contact with the first inclined body surface and the second wedge having a second inclined wedge surface in sliding contact with the second inclined body surface
a support shaft having a first end connectable to a portion of a test machine and a second end supporting the first and second wedges;
a drive supported by the support shaft, the drive located between the second end and the first end; and
a spring connected to the head body at a first end and to the drive at a second end.

23. A test specimen holder comprising;
a head body having a first inclined body surface and a second inclined body surface facing each other;
a first and second wedge located in the head body, the first wedge having a first inclined wedge surface in sliding contact with the first inclined body surface and the second wedge having a second inclined wedge surface in sliding contact with the second inclined body surface;
a mount joined to the head body at a first end and having a bore;
a support shaft disposed in the bore and having a first end supporting the first and second wedges; and
a spring urging the support shaft toward the head body.

24. The test specimen holder of claim 23 wherein the bore includes an inner flange, a first end of the spring engaging the support shaft and a second end engaging the inner flange.

25. The test specimen holder of claim 24 wherein the spring comprises a compression spring.

26. The test specimen holder of claim 23 and comprising an adjuster adjusting a force urging the support shaft toward the head body.

27. The test specimen holder of claim 26 wherein the adjuster comprises an actuator joined to the support shaft.

28. The test specimen holder of claim 27 wherein the actuator comprises a screw threadably joined to the mount.

29. The test specimen holder of claim 23 and further comprising a handle joined to the support shaft.

30. The test specimen holder of claim 29 wherein the handle comprises portions extending in opposite directions from a longitudinal axis of the support shaft.

31. The test specimen holder of claim 23 wherein at least one of the mount or the head body comprises one of an aperture opening to an outer surface and extending inwardly transversely to a longitudinal axis of the support shaft or a pin extending away from the outer surface in a direction transversely from the longitudinal axis.

32. The test specimen holder of claim 22 wherein the drive is configured to pull the second end of the spring away from the head body.

33. The test specimen holder of claim 32 wherein the drive comprises a first portion movable with respect to a second portion, the first portion being connected to the second end of the spring and the second portion engages or is fixedly joined to a portion of the support shaft.

34. The test specimen holder of claim 33 wherein the drive includes a driven part in contact with and movable relative to the first portion and the second portion.

35. The test specimen holder of claim 34 wherein the driven part is movable toward and away from a longitudinal axis of the support shaft.

36. The test specimen holder of claim 35 wherein the drive includes an actuator supported by the first portion in contact with the driven part.

37. The test specimen holder of claim 36 wherein engaging surfaces of the driven part and the second portion include an inclined surface on at least one of the driven part and/or the second portion.

38. The test specimen holder of claim 22 wherein the spring comprises a plurality of longitudinal spring elements disposed about the support shaft.

39. The test specimen holder of claim 33 wherein the second portion is integrally joined to the support shaft, the second portion and the support shaft being formed from a single unitary body.

40. The test specimen holder of claim 33 wherein the second portion is separable from the support shaft.

* * * * *